US012269580B2

(12) United States Patent
Bosworth et al.

(10) Patent No.: US 12,269,580 B2
(45) Date of Patent: Apr. 8, 2025

(54) SYSTEMS AND METHODS FOR AIRCRAFT LOAD ALLEVIATION

(71) Applicant: Archer Aviation, Inc., San Jose, CA (US)

(72) Inventors: Jeffrey Mark Bosworth, Argyle, TX (US); Nathan Paul Pringle, Greensboro, NC (US); Nathan Thomas Depenbusch, Mountain View, CA (US)

(73) Assignee: ARCHER AVIATION INC., San Jose, CA (US)

( * ) Notice: Subject to any disclaimer, the term of this patent is extended or adjusted under 35 U.S.C. 154(b) by 0 days.

(21) Appl. No.: 18/737,726

(22) Filed: Jun. 7, 2024

(65) Prior Publication Data
US 2024/0400195 A1    Dec. 5, 2024

Related U.S. Application Data

(63) Continuation of application No. PCT/US2024/031455, filed on May 29, 2024.
(Continued)

(51) Int. Cl.
*B64C 13/16*    (2006.01)
*B64C 29/00*    (2006.01)
(Continued)

(52) U.S. Cl.
CPC .......... *B64C 13/16* (2013.01); *B64C 29/0033* (2013.01); *B64D 31/12* (2013.01); *G05D 1/617* (2024.01); *G05D 1/80* (2024.01)

(58) Field of Classification Search
None
See application file for complete search history.

(56) References Cited

U.S. PATENT DOCUMENTS 5,001,646 A  3/1991  Caldwell et al.
5,374,011 A  12/1994  Lazarus et al.
(Continued)

FOREIGN PATENT DOCUMENTS

CN   101578487 B   3/2013
CN   101321667 A   6/2013
(Continued)

OTHER PUBLICATIONS

Ruiz et al., "Aeroelastics-aware compensation system for soft aerial vehicle stabilization", Frontiers in Robotics and AI, Nov. 9, 2022, pp. 1-13 (Year: 2022).*

(Continued)

*Primary Examiner* — Tamara L Weber
(74) *Attorney, Agent, or Firm* — FINNEGAN, HENDERSON, FARABOW, GARRETT & DUNNER LLP

(57) ABSTRACT

Aspects of the present disclosure generally relate to systems and methods for flight control of aircrafts driven by electric propulsion systems and in other types of vehicles. In some embodiments, a flight control system of an aircraft is disclosed, configured to receive one or more signals to control movement of the aircraft, determine at least one flight condition of the aircraft, wherein the at least one flight condition includes at least a phase of flight, calculate at least one or more loads associated with the aircraft based on the determined at least one flight condition; determine an optimized flight configuration to alleviate loads on one or more components of the aircraft based on the received one or more signals and the calculated loads, generate one or more effector commands based on the optimized flight configuration; and actuate one or more aircraft effectors based on the one or more effector commands.

21 Claims, 27 Drawing Sheets

Related U.S. Application Data

(60) Provisional application No. 63/504,958, filed on May 30, 2023.

(51) Int. Cl.
  B64D 31/12 (2006.01)
  G05D 1/617 (2024.01)
  G05D 1/80 (2024.01)

(56) References Cited

U.S. PATENT DOCUMENTS

| | | | |
|---|---|---|---|
| 6,161,801 | A | 12/2000 | Kelm et al. |
| 6,353,273 | B1 | 3/2002 | Heshmat et al. |
| 6,375,127 | B1 | 4/2002 | Appa |
| 6,666,410 | B2 | 12/2003 | Boelitz et al. |
| 8,209,159 | B2 | 6/2012 | Bensch et al. |
| 8,255,096 | B2 | 8/2012 | Wildschek et al. |
| 9,120,555 | B2 | 9/2015 | Kendall et al. |
| 9,227,721 | B1 | 1/2016 | Nguyen |
| 9,446,837 | B2 | 9/2016 | Wildschek et al. |
| 9,751,614 | B1 * | 9/2017 | Nguyen ............... B64C 15/02 |
| 9,898,033 | B1 | 2/2018 | Long |
| 10,023,305 | B2 | 7/2018 | Isom et al. |
| 10,118,696 | B1 | 11/2018 | Hoffberg |
| 10,518,864 | B2 * | 12/2019 | Lassen ................ B64C 3/56 |
| 11,059,569 | B1 | 7/2021 | Nguyen et al. |
| 11,203,410 | B2 | 12/2021 | Wilson et al. |
| 11,242,134 | B1 | 2/2022 | Nguyen et al. |
| 11,720,123 | B2 | 8/2023 | Ouellet et al. |
| 11,834,152 | B2 | 12/2023 | Ho et al. |
| 2002/0153452 | A1 | 10/2002 | King et al. |
| 2004/0093130 | A1 | 5/2004 | Osder et al. |
| 2010/0076625 | A1 | 3/2010 | Yoeli |
| 2013/0138270 | A1 | 5/2013 | Christensen et al. |
| 2019/0332125 | A1 | 10/2019 | Irwin, III et al. |
| 2020/0333805 | A1 * | 10/2020 | English ............... G05D 1/654 |
| 2021/0011488 | A1 * | 1/2021 | Kearney-Fischer ... G05D 1/046 |

FOREIGN PATENT DOCUMENTS

| | | |
|---|---|---|
| CN | 102722606 A | 5/2014 |
| CN | 104345738 B | 4/2017 |
| CN | 104391364 A | 6/2017 |
| CN | 108516101 A | 2/2020 |
| CN | 110705154 A | 8/2020 |
| CN | 108121855 B | 4/2021 |
| CN | 115795622 A | 3/2023 |
| CN | 110309579 A | 5/2023 |
| DE | 60218328 T2 | 8/2007 |
| EP | 2296965 A1 | 3/2011 |
| EP | 3201711 B1 | 3/2021 |
| EP | 3891067 B1 | 1/2024 |
| RU | 2413658 C2 | 3/2011 |
| WO | 2002094655 A2 | 11/2002 |
| WO | 2009144312 A1 | 12/2009 |
| WO | 2012125842 A2 | 9/2012 |
| WO | 2015152910 A1 | 10/2015 |
| WO | 2020180373 A2 | 9/2020 |

OTHER PUBLICATIONS

Walker, G., et al., "F-35B Integrated Flight-Propulsion Control Development", 2013 international powered lift conference, 2013, 15 pages.

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B STOVL aircraft.", AIAA Guidance, Navigation and Control Conference and Exhibit, 2006, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

* cited by examiner

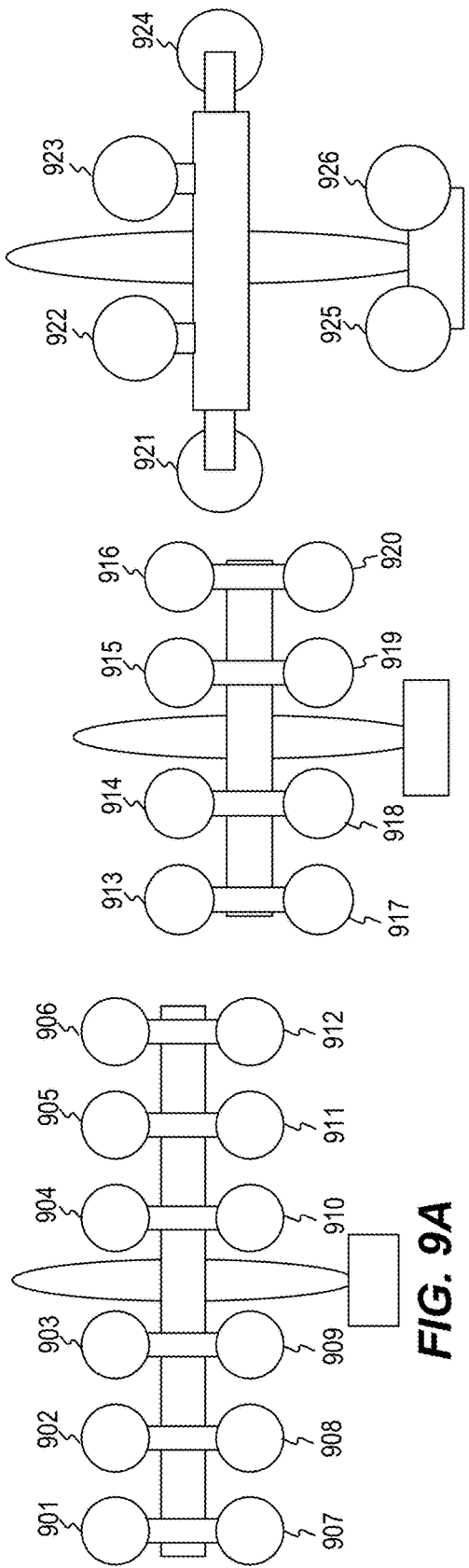
FIG. 9A
FIG. 9B
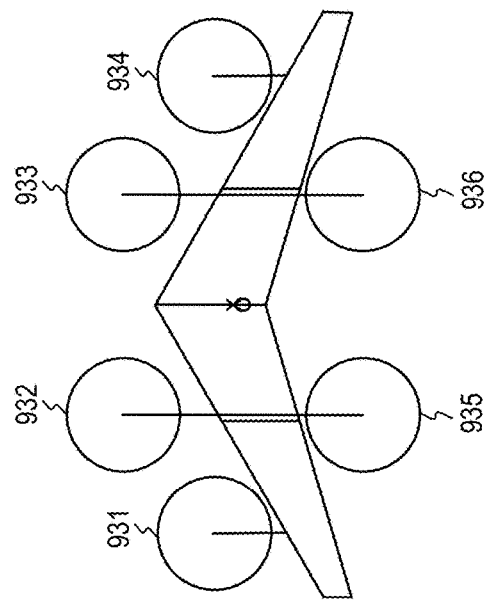
FIG. 9C
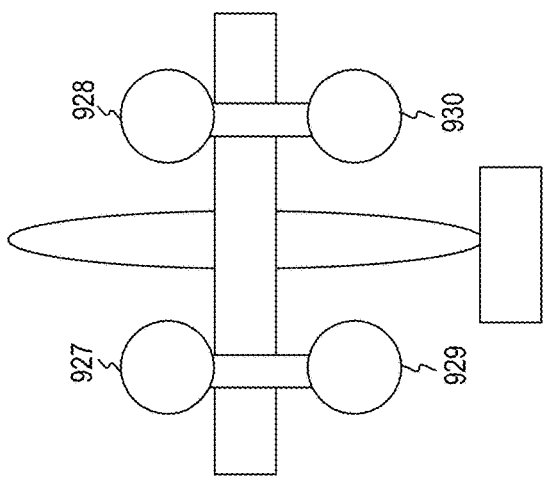
FIG. 9D
FIG. 9E

1300a

Avg approach 1310a

Tailored approach 1310b

Tailored approach w/ constraints 1310c

SYSTEMS AND METHODS FOR AIRCRAFT LOAD ALLEVIATION

CROSS-REFERENCE TO RELATED APPLICATIONS

This disclosure claims priority to and is a continuation of International Application No. PCT/US24/31455, titled "SYSTEMS AND METHODS FOR AIRCRAFT LOAD ALLEVIATION," filed May 29, 2024, which claims priority to U.S. Provisional Application No. 63/504,958, titled "SYSTEMS AND METHOD FOR FLIGHT CONTROL OF EVTOL AIRCRAFT," filed May 30, 2023, the contents of which are incorporated herein in their entirety for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electrical or hybrid-electric propulsion systems (hereinafter referred to as electric propulsion units or "EPUs"). Throughout its operational lifespan, an aircraft may face various load-related challenges. Over time and depending on certain maneuvers, loads may not only affect fuel efficiency and passenger comfort, but may also affect structural integrity and compromise safety, such as by leading to accidents due to structural failure.

While conventional aircrafts may simply adjust control surfaces, such as ailerons, elevators, and rudders to address aerodynamic stresses, some aircrafts may be more architecturally complex than conventional aircrafts, and may benefit from more sophisticated methods to alleviate loads. For example, aircrafts with vertical takeoff and landing capabilities or distributed propulsion systems may comprise a significantly higher number of actuators or effectors than conventional aircrafts. Such aircraft, as well as conventional aircraft, may benefit from more advanced techniques for generating effector commands to optimize thrust distribution and minimize loads. These techniques may also be used to provide similar benefits to conventional aircraft.

Therefore, there is a need for improved systems and methods for certain aircrafts to alleviate loads.

SUMMARY

The present disclosure relates generally to flight control of electric aircraft and other powered aerial vehicles. More particularly, and without limitation, the present disclosure relates to innovations in tilt-rotor aircraft that use electrical propulsion systems. For example, certain aspects of the present disclosure relate to a flight control system of an aircraft configured to receive one or more signals to control movement of the aircraft, determine, using a plurality of sensors included in the aircraft, at least one flight condition of the aircraft, wherein the at least one flight condition includes at least a phase of flight, calculate at least one or more loads associated with the aircraft based on the determined at least one flight condition, determine an optimized flight configuration to alleviate loads on one or more components of the aircraft based on the received one or more signals and the calculated loads, generate one or more effector commands based on the determined optimized flight configuration, and actuate one or more aircraft effectors based on the one or more effector commands.

BRIEF DESCRIPTION OF THE DRAWINGS

FIGS. 9A, 9B, 9C, 9D, and 9E illustrate exemplary top plan views of VTOL aircraft, consistent with disclosed embodiments.

DETAILED DESCRIPTION

Figure 1:
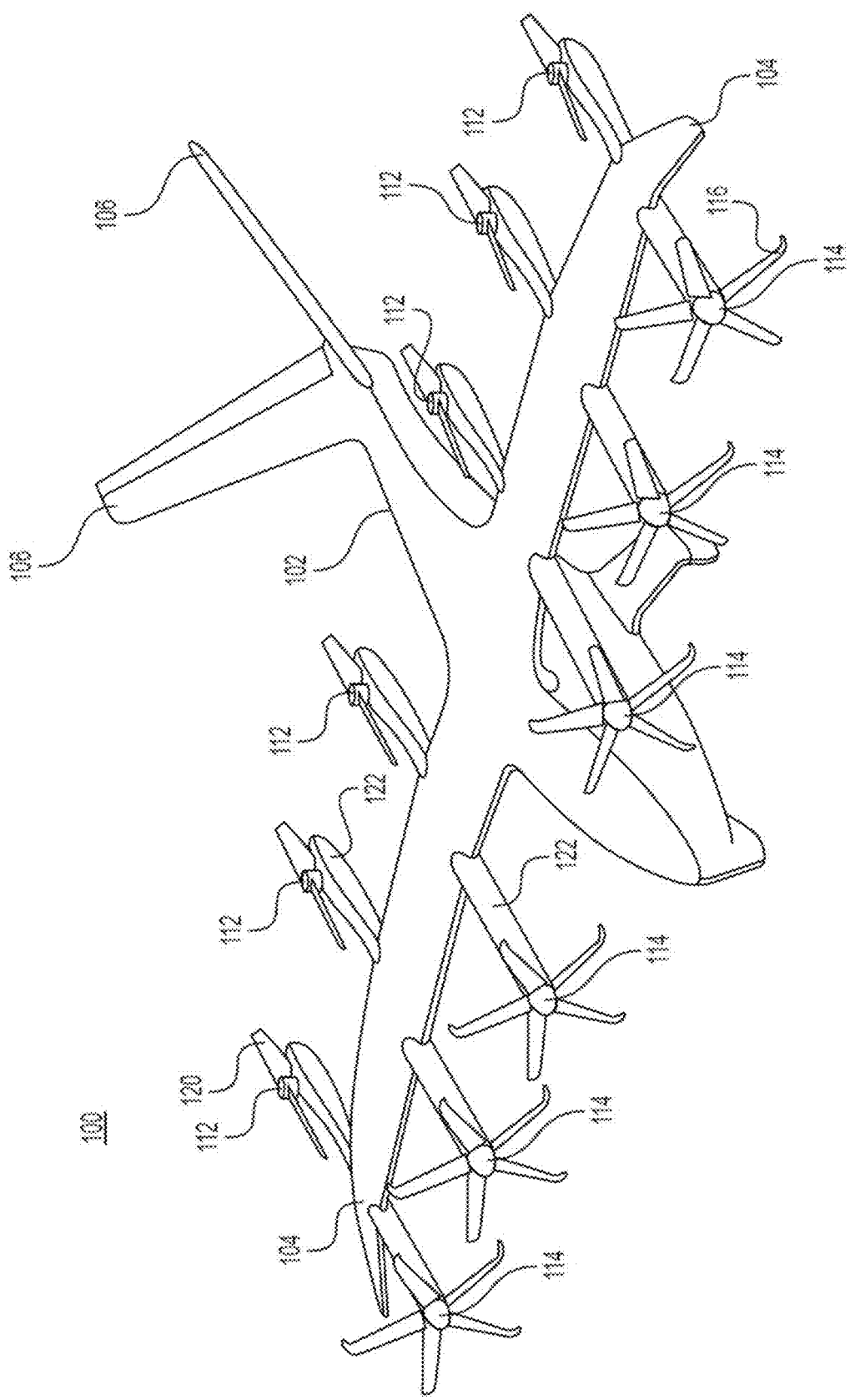
FIG. 1 shows an exemplary VTOL aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller, an actuator, an engine, a propulsion unit, fuselage, an effector) configured to enable the aircraft to fly. The aircraft may include any configuration that includes at least one propeller. In some embodiments, the aircraft is driven by one or more electric propulsion systems (hereinafter referred to as electric propulsion units or "EPUs"). The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to control the aircraft components in a manner that decreases loads to improve aircraft performance (e.g., increase safety, fuel efficiency, ride comfort, payload capacity, or structural integrity).

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft using at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase). In some embodiments, a phase of flight (e.g., hover, cruise, forward flight, takeoff, landing, transition to or from forward flight) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, sensor measurement (e.g., accelerometer measurement), or any other value indicating a current (e.g., experienced) or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed above, embodiments of the aircraft may include many movable structural flight elements that allow pilots to safely control the aircraft. Flight control surfaces (e.g., flaperons, flaps, ailerons, elevators, rudders, etc.) are critical to controlling the positioning of the aircraft. Changes to the orientation of these surfaces changes the airflow and pressure distribution around the aircraft, allowing the pilot to control the movement of the aircraft in three axes of rotation. Similarly, rotation and orientation control of propellers may provide lift support (e.g., lift required for vertical take-off, landing, and hovering) and may provide the forward thrust required to move the aircraft through the air. The movement of each of these flight elements is critical to the safety and stability of the aircraft.

As further detailed below with reference to FIG. 10, mitigating stresses (e.g., alleviating loads) on critical aircraft components may be paramount to ensure structural integrity, stability and safety of an aircraft. By actively managing aerodynamic forces, load alleviation may extend the operational lifespan of an aircraft and reduce risks of structural failures. While conventional aircrafts may be designed to handle predictable flight conditions and load distributions, more complex aircrafts, such as eVTOLs (electric vertical takeoff and landing aircraft), may require more complex algorithms for alleviating loads. For example, unlike traditional fixed-wing aircrafts, eVTOLs may employ distributed propulsion systems, unique configurations (e.g., structural architecture), and/or multiple flight modes. As a result, alleviating loads in eVTOLs may be improved through complex algorithms and control strategies to manage dynamic aerodynamic loads during different phases of flight (e.g., vertical takeoff, hover, transition to forward flight, forward flight, conventional landing, vertical landing etc.). Furthermore, some aircrafts may be designed to operate in urban environments with critical noise regulations, which may further complicate load alleviation methods.

The disclosed embodiments determine optimized flight configurations to alleviate (e.g., minimize, distribute, allocate, balance, reduce, manage, and/or control) loads (e.g., aerodynamic loads, weight loads, engine loads, structural loads, dynamic loads). In some embodiments, determining optimized flight configurations is based on one or more received movement signals. In some embodiments, determining optimized flight configurations is based on one or more moments or loads associated with the aircraft. In some embodiments, the one or more moments or loads are determined based on at least one determined flight condition. In some embodiments, the at least one flight condition is determined using one or more sensors included in the aircraft. Further, the disclosed embodiments generate one or more effector commands based on the determined optimized flight configuration. The one or more effector commands may cause actuation of one or more aircraft effectors.

The disclosed embodiments may include load alleviation techniques tailored to configurations unique to certain aircrafts (e.g., aircrafts with distributed propulsion systems and/or multiple flight modes, eVTOLs). As a result of implementing such load alleviation techniques, the disclosed embodiments may compensate for the use of lighter materials in constructing the aircraft, and may also allow for increased battery efficiency and/or extended range. For example, with a limited amount of power available for use on an aircraft, there may be a need to actively manage (e.g., command) each aircraft component for operational efficiency. By performing load alleviation, the disclosed embodiments may result in reduced loads (allowing for using lighter materials for aircraft construction), reduced unnecessary oscillations or vibrations, and/or optimized use of aircraft components which may improve energy efficiency. The disclosed embodiments may further reduce power draw from one or more power sources by causing more stable flight operations, fewer structural disruptions, and/or avoidance of high structural loads, sudden turns and/or altitude changes which could lead to sudden high-power demands and stress the batteries.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
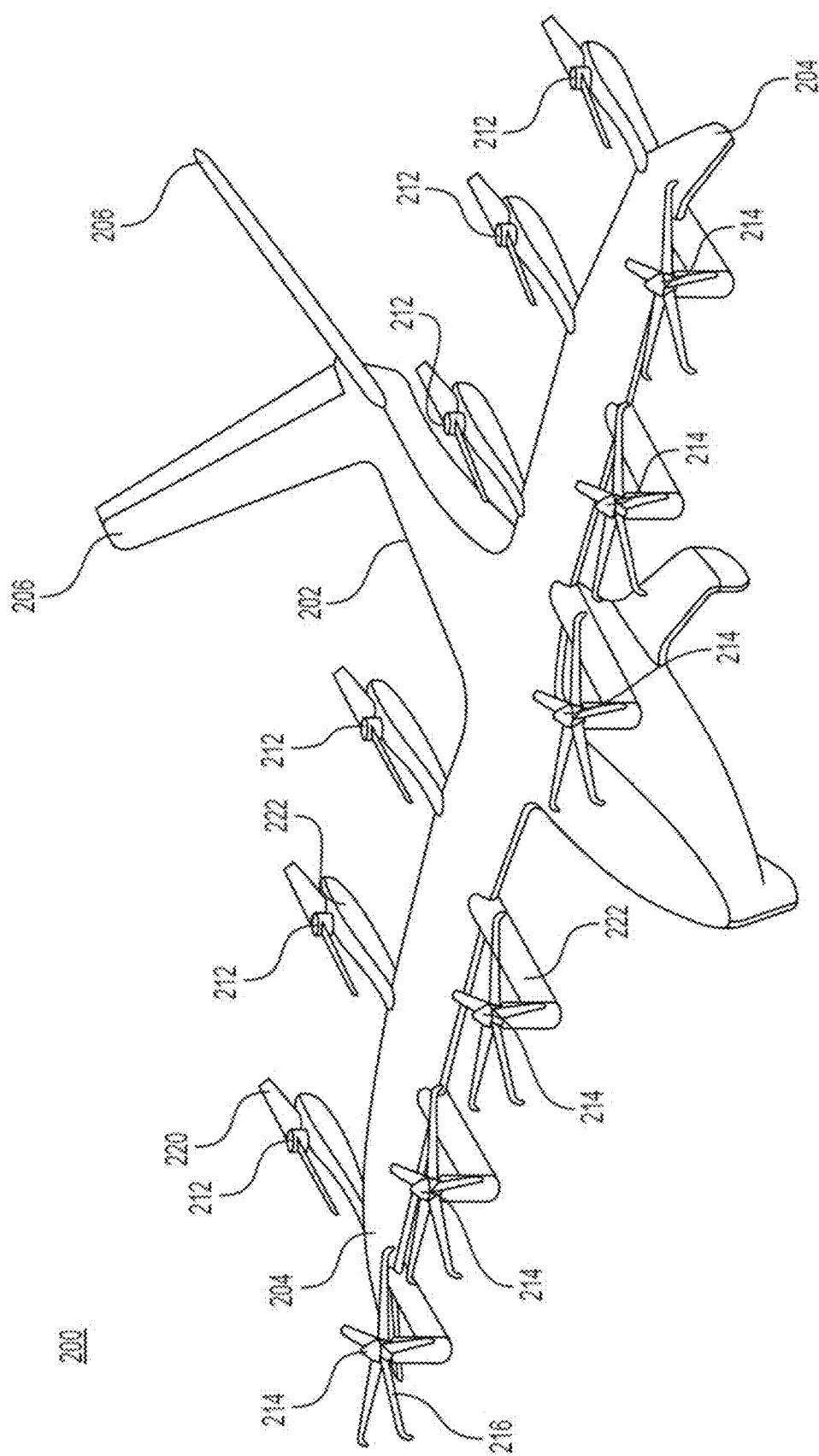
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may be canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figure 3:
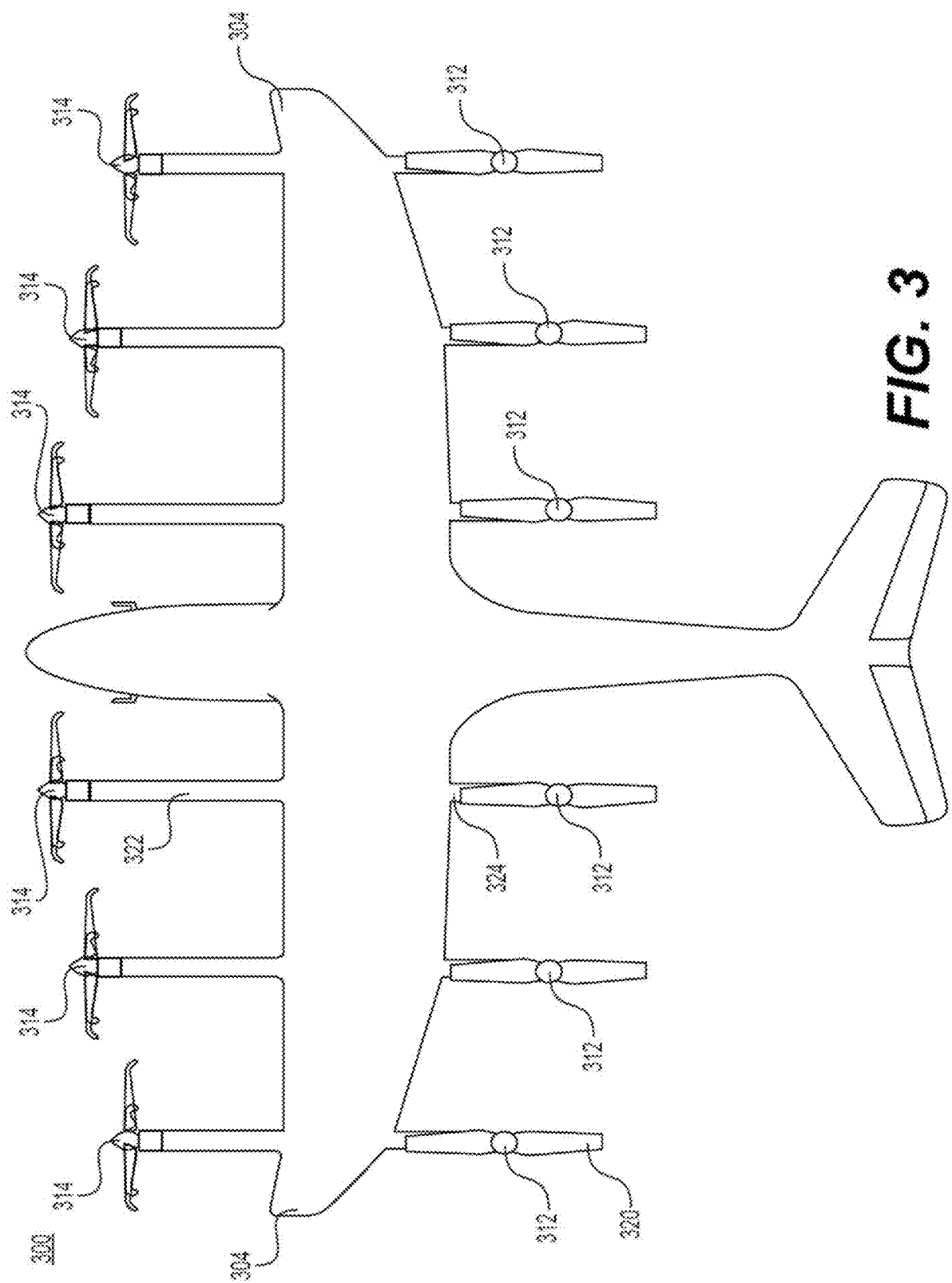
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
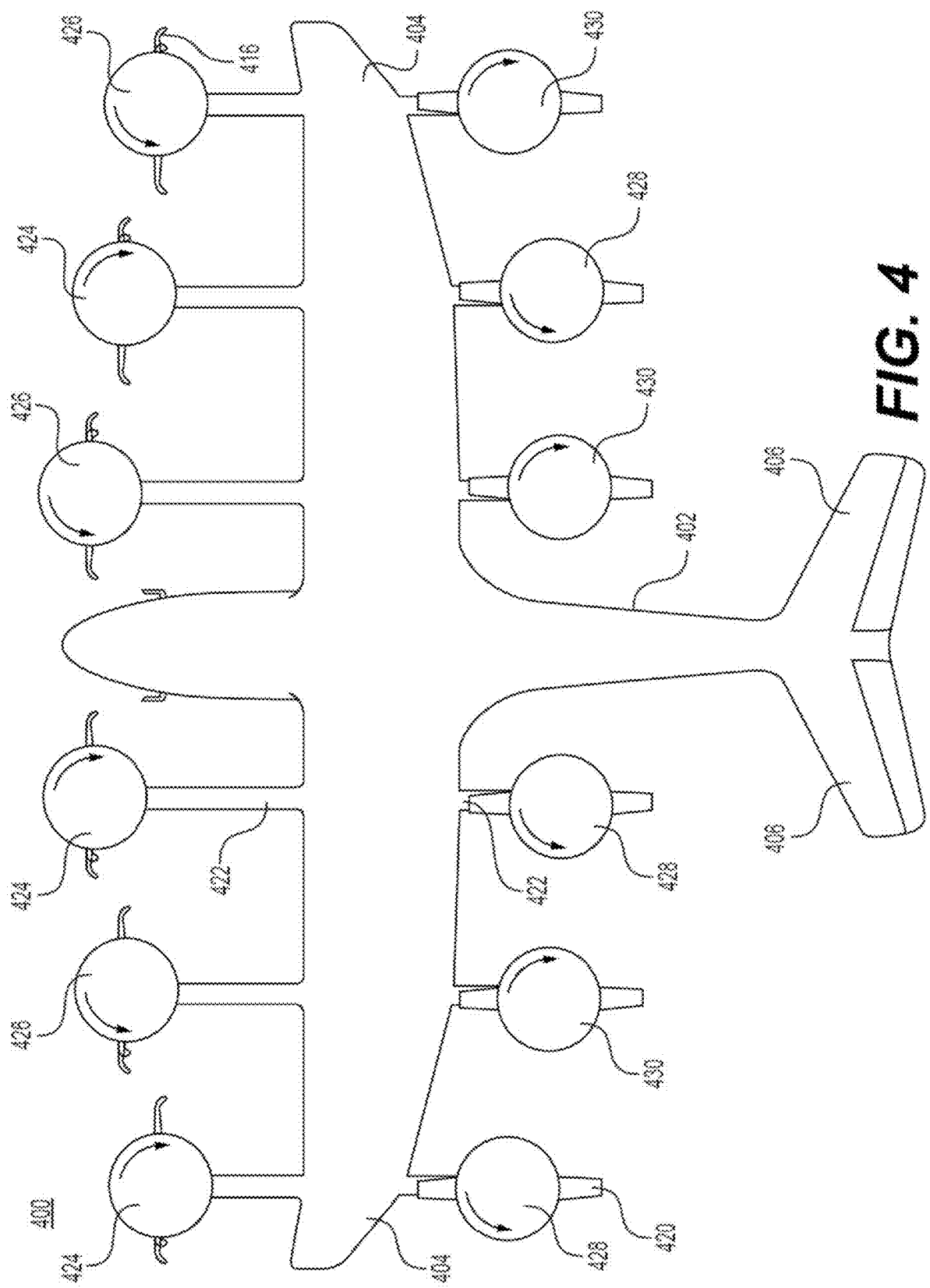
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of clockwise (CW) type 424 and the remaining three forward electric propulsion systems being of CCW type. In some embodiments, three aft electric propulsion systems may be of counter-clockwise (CCW) type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
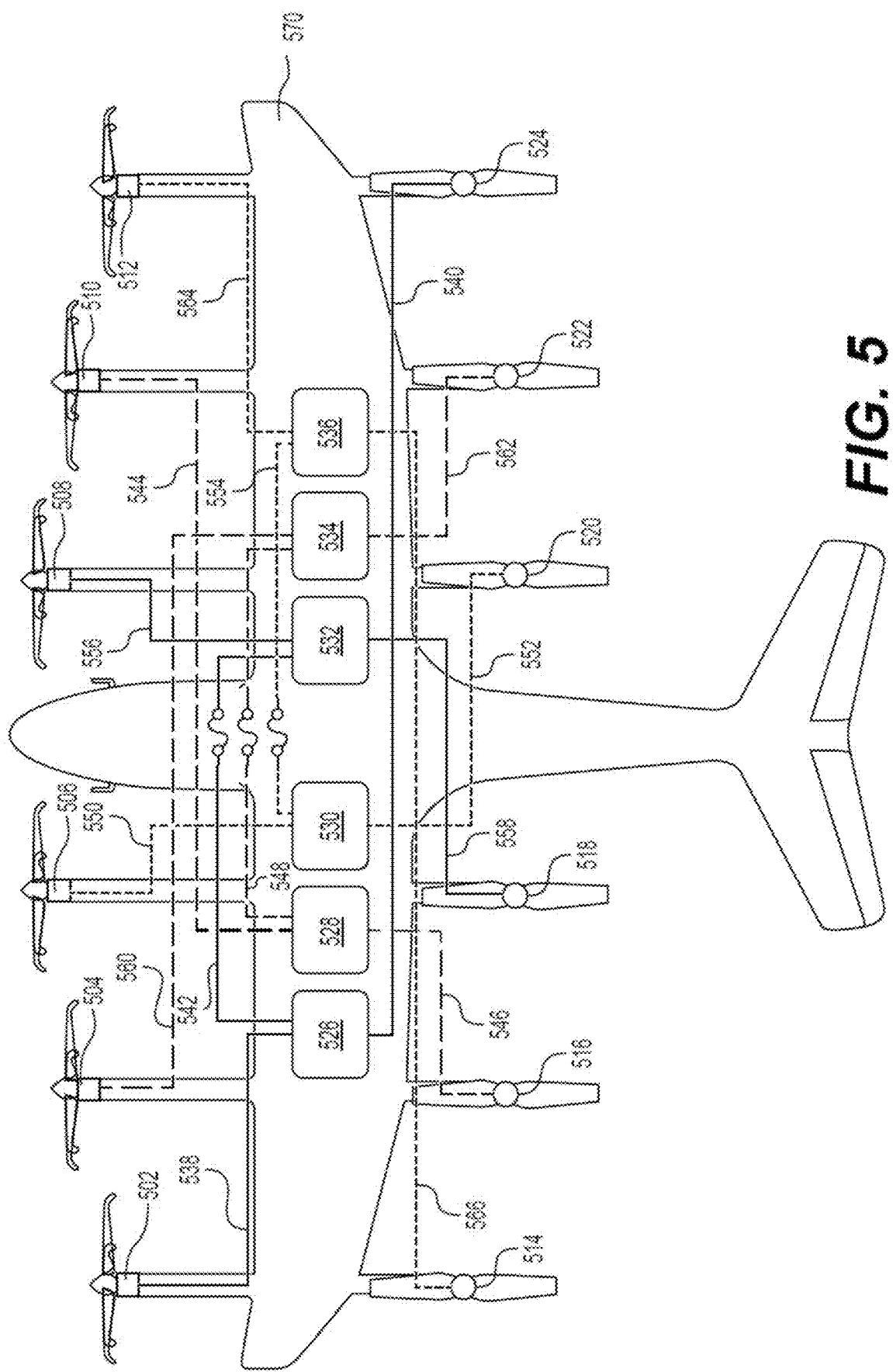
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems (e.g., battery packs) 526, 528, 530, 532, 534, and 536 stored within the wing 570 of the aircraft 500. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

Figure 6:
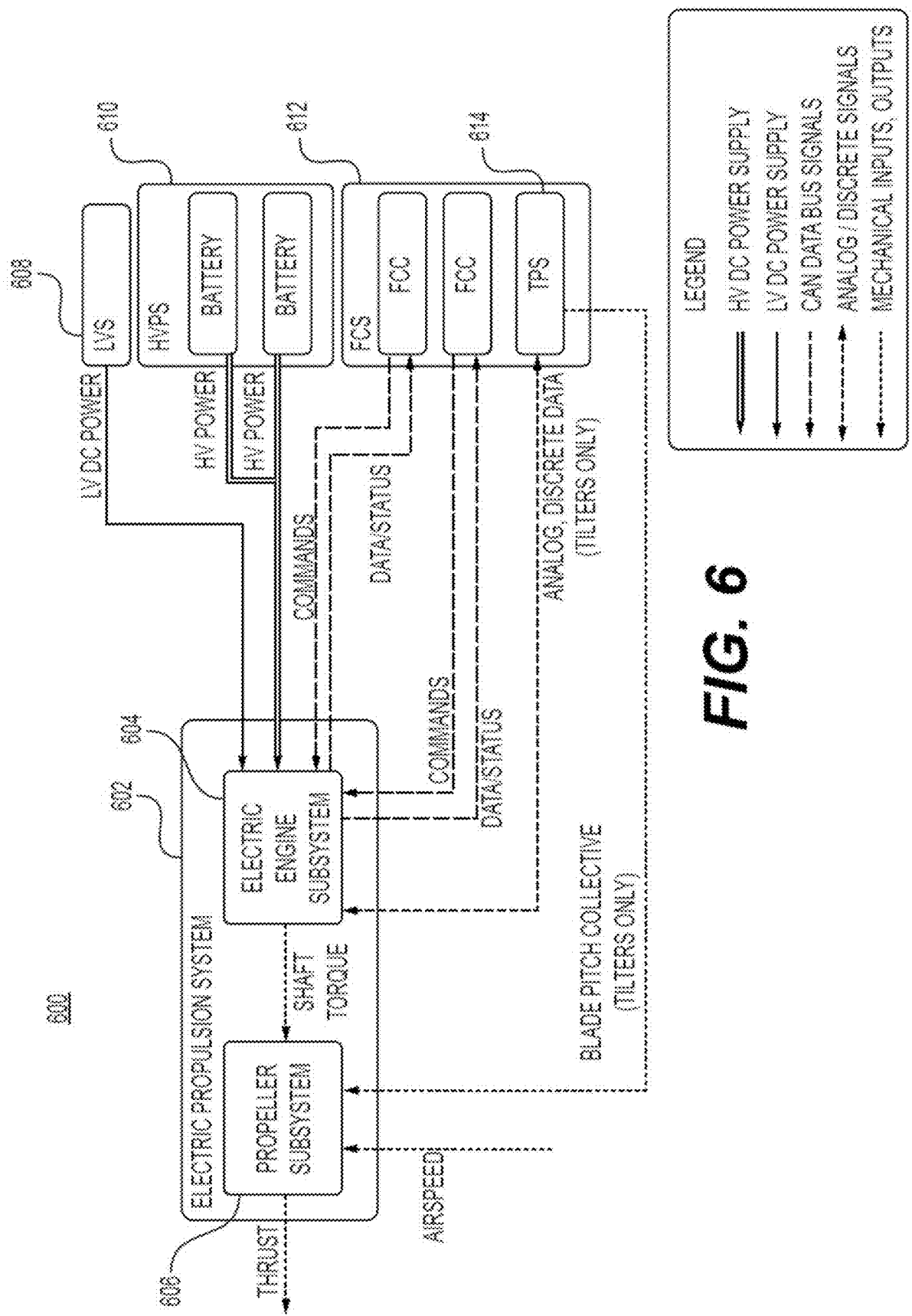
FIG. 6 is a schematic block diagram of an exemplary architecture and design of electric propulsion power and control system consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply.

FIG. 6 is a schematic block diagram of an exemplary architecture and design of electric propulsion power and control system 600 consistent with disclosed embodiments. Electric propulsion power and control system 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is lower in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer capable of using Controller Area Network ("CAN") data bus signals to send commands to the electric engine subsystem 604 and receive status and data from the electric engine subsystem 604. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system (TPS) 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
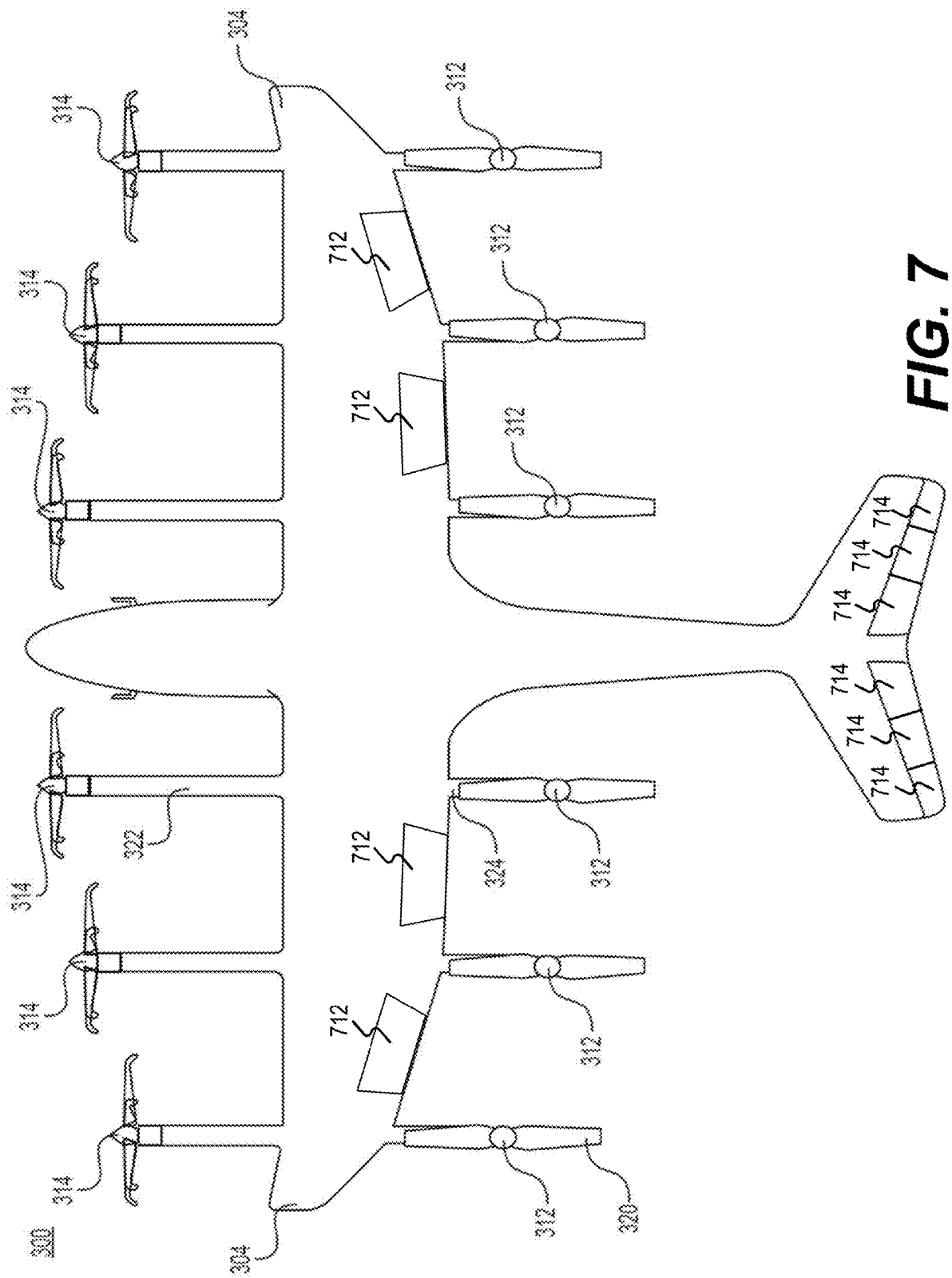
FIG. 7 shows an exemplary top plan view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plan view of an exemplary VTOL aircraft, consistent with embodiments of the present disclosure. Aircraft 700 shown in the figure may be a top plan view of the aircraft 100, 200 shown in FIGS. 1 and 2, respectively. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions of one or more rudders and/or one or more elevators. Additionally or alternatively, control surfaces may include separate rudders and elevators. In aircraft 700, the actuators may include, in addition to the electric propulsion systems discussed earlier, control surface actuators (CSAs) associated with flaperons 712 and ruddervators 714, as discussed further below with reference to FIG. 8.

Figure 8:
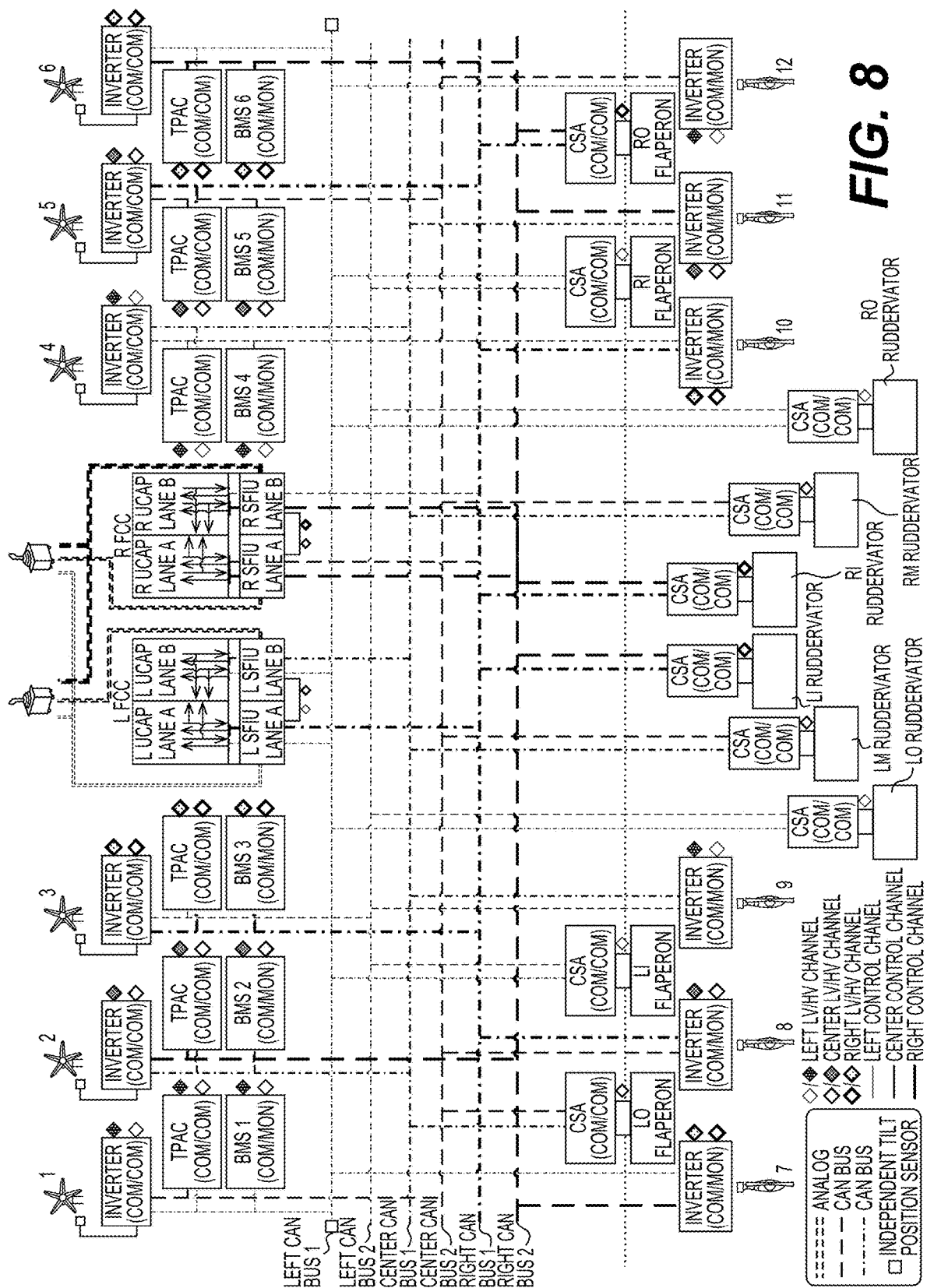
FIG. 8 is a schematic illustration of a flight control signaling architecture for controlling the control surfaces and associated actuators, consistent with disclosed embodiments.

FIG. 8 is a schematic illustration of a flight control signaling architecture 800 for controlling the control surfaces and associated actuators, consistent with disclosed embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)—Left FCC, Lane A (L FCC-A) 801, Left FCC, Lane B (L FCC-B) 802, Right FCC, Lane A (R FCC-A) 803, and Right FCC, Lane A (R FCC-B) 804, although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing process required to control the control surfaces and actuators may be performed on a single computing thread by a single flight control computer.

The FCCs may provide control signals to the control surface actuators, including the EPU inverters 806, TPACs 808, BMSs 809, flaperon CSAs 810, and ruddervator CSAs 811, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

FIGS. 9A-9E are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in an VTOL aircraft. As further described below, the number and orientation of propellers (and other effectors or actuators) may affect how forces are created. Therefore, the flight control system may adjust aircraft effectors or actuators in certain ways (e.g., those discussed in disclosed embodiments) to control the aircraft in a manner that reduces loads.

FIG. 9A illustrates an arrangement of electric propulsion systems 900, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems 901, 902, 903, 904, 905, 906 and six aft electric propulsion systems 907, 908, 909, 910, 911, 912. In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion systems 940, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems 913, 914, 915, 916 and four aft electric propulsion systems 917, 918, 919, 920. In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion systems 950, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, 924 coplanar in a first plane and a second set of two electric propulsion systems 925, 926 coplanar in a second plane. In some embodiments, the first set of electric propulsion systems 921-924 may be operatively connected to tilt propellers and second set of electric propulsion systems 925, 926 may be operatively connected to lift propellers. In other embodiments, the first set of electric propulsion systems 921-924 and the second set of aft electric propulsion systems 925, 926 may all be operatively connected to tilt propellers.

FIG. 9D illustrates an alternate arrangement of electric propulsion systems 960, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, 920. In some embodiments, all of the electric propulsion systems may be operatively connected to tilt propellers.

FIG. 9E illustrates an alternate arrangement of electric propulsion systems 970, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may have four forward electric propulsion systems 931, 932, 933, 934 operatively connected to tilt propellers and the two aft electric propulsion systems 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

As disclosed herein, the forward electric propulsion systems and aft electric propulsion systems may be of a clockwise (CW) type or counterclockwise (CCW) type.

Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

Figure 10:
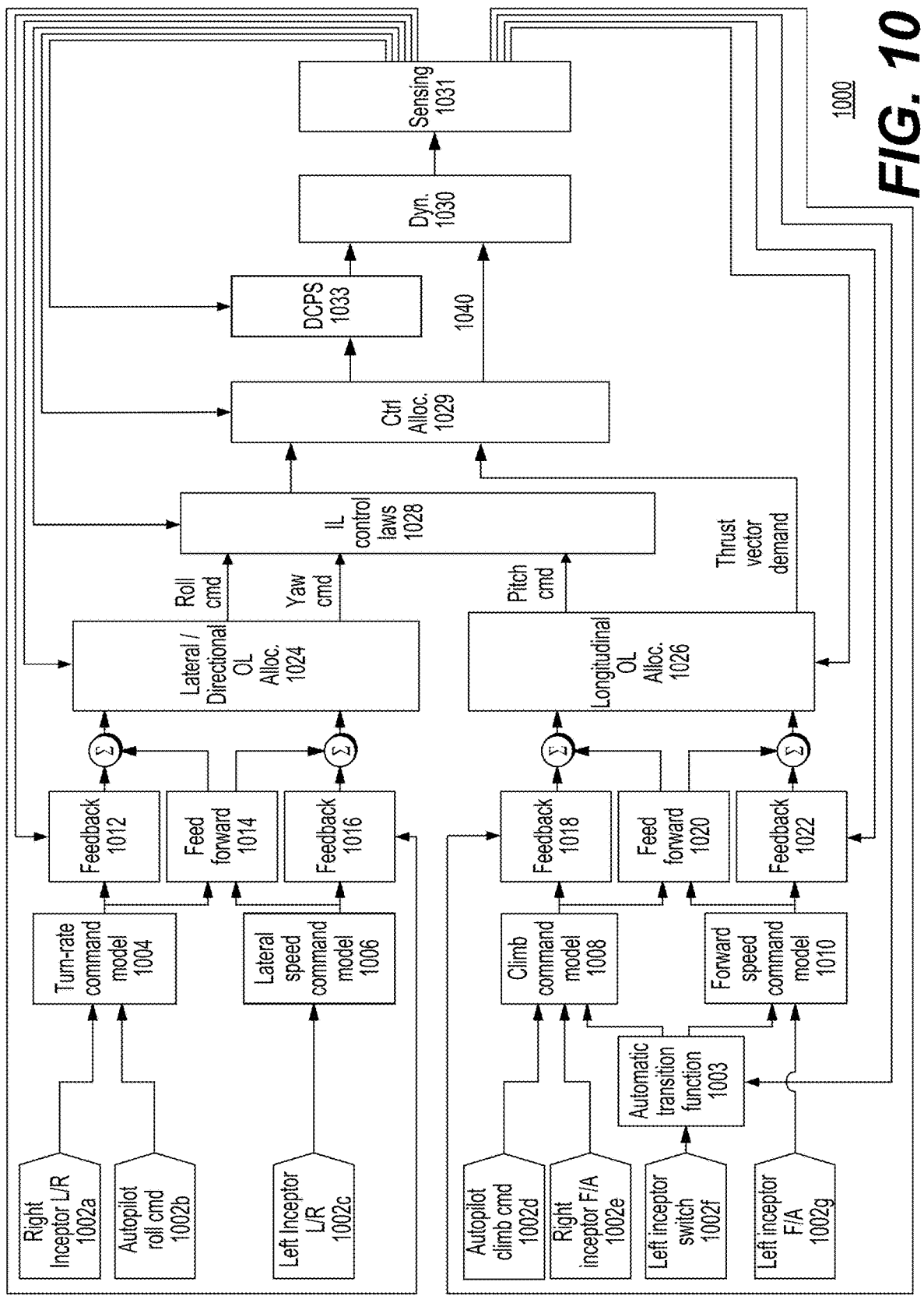
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one a microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many conventional functions of the control system are not shown in FIG. 10 for case of description. System 1000 further includes one or more storage mediums storing model (s), function(s), table(s), and/or any information for executing the disclosed processes. As further described below, any or each box indicating a command model 1004, 1006, 1008, 1010, feedback 1012, 1016, 1018, 1022, feed forward 1014, 1020, outer loop allocation 1024, 1026, inner loop control laws 1028, control allocation 1029, and DCPS 1033 may represent or include module(s), script(s), function(s), application(s), and/or program(s) that are executed by processor (s) and/or microprocessor(s) of system 1000. It is appreciated that the complexity and interconnectedness of the functional block diagram of FIG. 10 would be impossible, or at least impractical, to effectively implement by a human user, especially when considering that these functionalities are implemented (e.g., in real time) while the aircraft is flying (including taking off or landing).

In some embodiments, control system 1000 may be configured based on one or more flight control laws. Flight control law may comprise a set of algorithms, models, and/or rules configured to govern a behavior of an aircraft (e.g., control or influence one or more effectors of the aircraft) in response to one or more pilot inputs and external factors. In some embodiments, flight control laws may be configured to achieve at least one of desired flight characteristics, stability, or performance. For example, flight control laws may be configured to ensure stability and controllability of an aircraft by controlling how the aircraft responds to at least one of one or more pilot inputs, vehicle dynamics (e.g., disturbances, such as turbulence, gusts, etc.), or changes in flight conditions (e.g., altitude, airspeed, angle of attack, torque of one or more propellers).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving left/right 1002a and/or forward/aft 1002e), left inceptor(s) (e.g., moving left/right 1002c and/or forward/aft 1002g), and/or left inceptor switch 1002f. In some embodiments, a pilot input device may include an interface with an autopilot system (e.g., display screen(s), switch(es), button(s), lever(s), and/or other interface(s)). Optionally, system 1000 may further detect inputs from an autopilot system, such as autopilot roll command 1002b, autopilot climb command 1002d, and/or other command(s) to control the aircraft.

In some embodiments, the one or more inputs may include at least one of a position and/or rate of a right inceptor and/or a left inceptor, signals received (e.g., response type change commands, trim inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 1002a may comprise a lateral position and/or rate of a right inceptor (e.g., an inceptor positioned to the right of another inceptor and/or an inceptor positioned on the right side of a pilot area), autopilot roll cmd 1002b may comprise a roll signal received in autopilot mode, left inceptor L/R 1002c may comprise a lateral position and/or rate of a left inceptor (e.g., an inceptor positioned to the left of another inceptor and/or an inceptor positioned on the left side of a pilot area), autopilot climb cmd 1002d may comprise a climb signal received in autopilot mode, right inceptor F/A 1002e may comprise a longitudinal position and/or rate of the right inceptor, left inceptor switch 1002f may comprise a signal from a switch for enabling or disabling automatic transition function 1003, and left inceptor F/A 1002g may comprise a longitudinal position and/or rate of the left inceptor.

Each input may include data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/ maximum values) for individual actuator commands. Battery states may correspond to remaining energy of the battery packs of the aircraft, which may be monitored when control allocation 1029 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 1004, 1006, 1008, 1010 may be configured to determine a shape (e.g., aggressiveness, slew rate, damping, overshoot, etc.) of an ideal aircraft response. For example, each command model of command models 1004, 1006, 1008, 1010 may be configured to receive and interpret at least one of inputs 1002a, 1002b, 1002c, 1002d, 1002e, 1002f, 1002g and, in response, compute a corresponding change to an aircraft's orientation, heading, and propulsion, or a combination thereof using an integrator (not pictured). In some embodiments, right inceptor L/R 1002a and autopilot roll cmd 1002b may be fed into turn-rate command model 1004, left inceptor L/R 1002c may be fed into lateral speed command model 1006, autopilot climb cmd 1002d and right inceptor F/A 1002*e* may be fed into climb command model 1008, and left inceptor F/A 1002*g* may be fed into forward speed command model 1010. In some embodiments, an output from automatic transition function 1003 may be fed into at least one of climb command model 1008 or forward speed command model 1010. For example, based on receiving an enable signal from left inceptor switch 1002*f*, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (e.g., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

Feed forward 1014 and 1020 may each receive as input one or more desired changes (e.g., desired position, speed and/or acceleration) from corresponding command models 1004, 1006, 1008, 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 1014, 1020 may be configured to determine the corresponding force using simplified models of aircraft dynamics. For example, based on a known (e.g., a stored value of) or determined mass of the aircraft, feed forward 1014, 1020 may be configured to determine a force to cause the aircraft to follow a desired acceleration command. In some embodiments, feed forward 1014, 1020 may be configured to use a model predicting an amount of drag on the vehicle produced as a function of speed in order to determine a force required to follow a desired speed command signal.

Feedback 1012, 1016, 1018, 1022 may each receive as input the one or more desired changes (e.g., desired position, speed and/or acceleration) from command models 1004, 1006, 1008, 1010 as well as data received from vehicle sensing 1031 indicative of vehicle dynamics 1030. For example, sensed vehicle dynamics 1030 may comprise a representation of the physics and/or natural dynamics of the aircraft, and Vehicle Dynamics Sensing 1031 sensor measurements may capture how the aircraft moves in response to pilot inputs, propulsion system outputs or ambient conditions. Additionally or alternatively, data received from vehicle sensing 1031 may include error signals generated, by one or more processors, based on exogenous disturbances (e.g., gust causing speed disturbance). In some embodiments, feedback 1012, 1016, 1018, 1022 may be configured to generate feedback forces (e.g., at an actuator) based on the received error signals. For example, feedback 1012, 1016, 1018, 1022 may generate feedback forces with the intent of counteracting the effect(s) of external disturbances. Additionally or alternatively, feedback 1012, 1016, 1018 and 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors (e.g., included in vehicle sensing 1031) may generate an error signal which may be looped into feedback 1012, 1016, 1018 or 1022 to determine an additional force needed to correct the error.

In some embodiments, feedback 1012, 1016, 1018, 1022 may be disabled. For example, in response to losing position and/or ground speed feedback due to disruption of global position system (GPS) communication, system 1000 may be configured to operate without feedback 1012, 1016, 1018, 1022 until GPS communication is reconnected.

In some embodiments, feedback 1012, 1016, 1018, 1022 may receive as input a plurality of measurements as well as a trust value for each measurement indicating whether the measurement is valid. For example, one or more processors of system 1000 may assign a Boolean (true/false) value for each measurement used in system 1000 to indicate that the measurement is trustworthy (e.g., yes) or that the measurement may be invalid (e.g., no). Based on one or more processors identifying a measurement as invalid, feedback 1012, 1016, 1018, 1022 may omit that measurement for further processing. For example, in response to one or more processors identifying a heading measurement as invalid, feedback 1012, 1016, 1018, 1022 may omit subsequent heading measurements in determining feedback force(s).

In some embodiments, feedback 1012, 1016, 1018, 1022 may determine one or more feedback forces based on actuator state information received from one or more sensors (e.g., included in vehicle sensing 1031). For example, in response to actuator state information indicating that there is a failure of an actuator, one or more processors of system 1000 may update one or more processes of system 1000 and determine an alternative command to achieve the desired change. For example, one or more processors of system 1000 may adjust one or more model(s), function(s), algorithm(s), table(s), input(s), parameter(s), threshold(s), and/or constraint(s) in response to the failure of an actuator. Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018, 1022 and feed forward 1014, 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

Lateral/directional outer loop allocation 1024 and longitudinal outer loop allocation 1026 may each be configured to receive as input one or more desired forces and data received from vehicle sensing 1031 (e.g., airspeed, vehicle orientation, vehicle load factor, measured acceleration, vehicle mass and inertia, indications of working/failed actuators, air density, altitude, aircraft mode, whether the aircraft is in the air or on the ground, etc.). Based on the inputs, outer loop allocations 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (e.g., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (e.g., pitch angle) or a thrust vector demand. A thrust vector demand may include longitudinal thrust (e.g., mix of nacelle tilt and front propeller thrust) and vertical thrust (e.g., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, Longitudinal Outer Loop Allocation 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed vehicle dynamics (e.g., from vehicle sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command(s). For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces, such as flaperons 712 and ruddervators 714 shown in FIG. 7), including flaperon(s), ruddervator(s), aileron(s), spoiler(s), rudder(s), and/or elevator(s). Vehicle dynamics 1030 represents the control of different flight elements (e.g., electric propulsion system(s) and/or control surfaces) and the corresponding effect on the flight elements and aircraft dynamics.

While the embodiment shown in FIG. 10 includes both Inner loop control laws 1028 and Outer loop allocation 1024, 1026, in some embodiments the flight control system may not include Outer loop allocation 1024, 1026. Therefore, a pilot inceptor input may create roll, yaw, pitch, and/or thrust commands. For example, a right inceptor may control roll and pitch and a left inceptor and/or pedal(s) may control yaw and thrust.

Control allocation 1029 may accept as inputs one or more of force and moment commands, data received from the one or more aircraft sensors, envelope protection limits, scheduling parameter, and optimizer parameters. Control allocation 1029 may be configured to determine, based on the inputs, actuator commands (e.g., thrust(s), torque(s), and/or propeller speeds for electric propulsion units) by minimizing an objective function (e.g., solving an optimization problem, such as continually) that includes one or more primary objectives, such as meeting commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. Envelope protection limits may include one or more boundaries that the aircraft should operate within to ensure safe and stable flight. In some embodiments, envelope protection limits may be defined by one or more of speed, altitude, angle of attack, or load factor. For example, envelope protection limits may include one or more bending moments or load constraints. In some embodiments, control allocation 1029 may use envelope protection limits to automatically adjust one or more control surfaces or control settings. Doing so may prevent the aircraft from undesirable scenarios such as stalling or structural strain or failure. In normal operation, the minimum command limit for a given actuator may include the maximum of: the minimum hardware based limit and the minimum flight envelope limit; and the maximum command limit for a given actuator may includes the minimum of: the maximum hardware based limit and the maximum flight envelope limit. In the case of an actuator failure, the command limits for the failed actuator correspond to the failure mode.

Control allocation 1029 sends commands to one or more flight elements to control the aircraft. The flight elements will move in accordance with the controlled command. Various sensing systems and associated sensors as part of Vehicle Dynamic Sensing 1031 may detect the movement of the flight elements and/or the dynamics of the aircraft and provide the information to Feedback 1012, 1016, 1018, 1022, Outer Loop allocation 1024, 1026, Inner Loop Control laws 1028, and Control Allocation 1029 to be incorporated into flight control.

As described above, vehicle sensing 1031 may include one or more sensors to detect vehicle dynamics. For example, vehicle sensing 1031 may capture how the aircraft moves in response to pilot inputs, propulsion system outputs or ambient conditions. Additionally or alternatively, vehicle sensing 1031 may detect an error in the aircraft's response based on exogenous disturbances (e.g., gust causing speed disturbance). Further, vehicle sensing 1031 may include one or more sensors to detect propeller speed, such as a magnetic sensor (e.g., Hall effect or inductive sensor) or optical sensors (e.g., a tachometer) to detect the rotor speed of the aircraft engine (and thereby the speed of the propeller). Vehicle sensing 1031 may include one or more sensors to detect nacelle tilt angle (e.g., a propeller rotation axis angle between a lift configuration (e.g., FIG. 2) and forward thrust configuration (e.g., FIG. 1)), such as a magnetic sensor (e.g., Hall effect or inductive sensor). Vehicle sensing 1031 may include one or more sensors configured to detect an engine torque and/or thrust, such as one or more current sensors or voltage sensors, strain gauges, load cells, and/or propeller vibration sensors (e.g., accelerometers).

Vehicle sensing 1031 may include one or more sensors configured to detect vehicle dynamics, such as acceleration and/or pitch orientation sensors (e.g., accelerometer(s), 3-axis accelerometer(s), gyroscope(s), 3-axis gyroscope(s), and/or tilt-position sensors to determine angles of engines) and airspeed sensors (e.g., pitot tube sensors). Vehicle sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components. In some embodiments, vehicle sensing 1031 may include an inertial navigation systems (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

DCPS 1033 may receive as inputs from control allocation 1029 and vehicle sensing 1031. For example, DCPS 1033 may receive at least one or more torque commands, one or more limits (e.g., envelope protection limits, engine torque rate limits, HV bus protection torque limits, etc.), or measured vehicle dynamics (e.g., measured revolutions-per-minute (RPM), measured voltage, etc.). DCPS 1033 may be configured to modify, based on the inputs, the one or more torque commands to dynamically generate one or more modified torque commands (e.g., dynamically varied torque commands). System 1000 may be configured to send the one or more dynamically modified torque commands to one or more engines of the aircraft. The disclosed embodiments may improve engine response to enhance aircraft stability and safety.

In some embodiments, system 1000 may include one or more load alleviation functions (not pictured), such as functions for maneuver load alleviation, normal load alleviation, vertical tail load alleviation, and gyroscopic (i.e., gyro) load alleviation. For example, in an over-actuated aircraft, there may be multiple ways to create vertical load from wing loads and a multitude of propellers. Existing aircraft typically have only a single method of creating forces about a given axis. In the aircraft of the disclosed embodiments, there may be a multitude of methods in all axes. By selectively taking advantage of the multitude of control load sources, one or more load alleviation functions may be configured to perform optimization to prioritize the ones that generate the lowest loads (e.g., aerodynamic loads, weight loads, engine loads, structural loads, dynamic loads, etc.) to keep overall loads down. The one or more load alleviation functions may be incorporated as part of one or more module(s), script(s), function(s), application(s), and/or program(s) of system 1000.

In some embodiments, load alleviation functions may be configured to reduce loads experienced by an aircraft during maneuvers (e.g., turns, climbs, descents). For example, load alleviation functions may be configured to control effectors or actuators connected to effectors based on control algorithms (e.g., flight control laws) to balance loads across an aircraft structure. In some embodiments, load alleviation may be performed based on one or more load factors. For example, load alleviation may be performed based on one or more load factors for each primary body axis (e.g., longitudinal load factor for longitudinal/roll axis, lateral load factor for lateral/pitch axis, normal load factor for vertical/yaw axis). Each load factor may refer to a ratio of a total aerodynamic force (e.g., combination of lift, drag, lateral force, side body force, tail force, etc.) acting on the aircraft to a weight of the aircraft. In some embodiments, load alleviation functions may be configured to determine a load factor. For example, a force acting on the aircraft may be measured using one or more sensors (e.g., accelerometers or any other sensor discussed herein) and the measured force may be used as part of a ratio with a known weight of the aircraft. Additionally or alternatively, load alleviation functions may be configured to, based on a load factor, distribute the load factor (e.g., load) across the wing to alleviate (e.g., minimize, distribute, reduce) stress on a structure of the aircraft. In some embodiments, load alleviation may include distributing thrust across a distributed propulsion system to balance loads. Additionally or alternatively, load alleviation may include adjusting one or more control surface deflections to balance loads. Doing so may mitigate loads imposed during maneuvers and ensure structural integrity.

In some embodiments, load alleviation functions may be configured to manage loads experienced by an aircraft during certain phases of flight, such as one or more of steady-state hover, ascent, descent, or forward flight. For example, load alleviation functions may be configured to optimize a distribution of loads across an airframe during normal flight operations. Additionally or alternatively, at least one load alleviation function may operate differently depending on the stage of flight, such as by measuring different values for certain variables (e.g., airspeed, pitch angle) and/or using different algorithms or models. Doing so may reduce structural fatigue and increase flight efficiency.

In some embodiments, load alleviation functions may be configured to alleviate (e.g., minimize, reduce, distribute) loads experienced by a vertical tail structure of an aircraft. For example, loads experienced by a vertical tail structure of an aircraft may be significant during certain phases of flight (e.g., vertical takeoff and landing), certain maneuvers, or certain conditions (e.g., crosswind). In some embodiments, load alleviation functions may be configured to dynamically adjust a vertical tail configuration to alleviate loads experienced by the vertical tail structure. Additionally or alternatively, load alleviation functions may be configured to dynamically adjust a distribution of aerodynamic forces to alleviate loads experienced by the vertical tail structure. Doing so may enhance stability and reduce structural stress.

In some embodiments, load alleviation functions may be configured to mitigate gyroscopic forces generated by rotating components (e.g., propeller, rotor, propulsion unit, etc.). For example, gyroscopic forces may induce undesirable pitching, rolling, or yawing moments. In some embodiments, load alleviation functions may be configured to mitigate gyroscopic forces by performing thrust vectoring. Thrust vectoring may comprise controlling a direction of thrust generated by one or more engines or propulsion units. Additionally or alternatively, load alleviation functions may be configured to mitigate gyroscopic forces by adjusting one or more control surfaces. Additionally or alternatively, load alleviation functions may be configured to adjust an orientation of one or more propulsion units (e.g., propeller tilt). Doing so may enhance overall safety and reliability of the aircraft.

In some embodiments, load alleviation functions may be configured to mitigate dynamic loads. For example, load alleviation functions may be configured to determine one or more dynamic loads based on data from one or more sensors. One or more sensors may include one or more accelerometers (e.g., wing-tip accelerometer, fuselage accelerometer on nose or tail), gyroscopes (e.g., fuselage rate gyro), strain gauges, high resolution doppler lidar (HRDL), or leading edge stagnation point sensors. In some embodiments, load alleviation functions may be configured to determine one or more dynamic loads based on flight data (e.g., aero, inertial angle of attack). Based on the determined one or more dynamic loads, load alleviation functions may be configured to distribute the loads such that the aircraft structure is minimally stressed. In some embodiments, load alleviation functions may be configured to mitigate dynamic loads to limit one or more wing bending moments.

Loads may refer to any forces or moments exerted on an aircraft's structure as a result of one or more factors. For example, one or more factors may include one or more of aerodynamic loads, weight loads, engine loads, structural loads, or dynamic loads. Aerodynamic loads may comprise loads such as lift, drag, or moments induced by airflow over the aircraft's surfaces (e.g., wings, rotors, engines, propellers, propulsion units, control surfaces, etc.). Weight loads may comprise loads caused by gravitational force acting on the aircraft's mass (e.g., weight of the aircraft, batteries, payload (e.g., passengers, cargo), fuel or other fluids, or other onboard equipment). Engine loads may comprise loads experienced during vertical takeoff, hover, or transition to forward flight (e.g., thrust, torque, bending moments exerted on rotor blades, hubs or supporting structures). Structural loads may comprise internal forces or moments induced within the an airframe in response to external loads (e.g., bending load, torsion, or shear stresses due to aerodynamic, weight, or inertial loads). Dynamic loads may comprise loads experienced during maneuvers, transitions between flight modes, or external disturbances (e.g., gusts, turbulence), such as accelerations, decelerations, or vibrations. For example, some load alleviation functions may be configured to perform gust load alleviation to alleviate loads caused by dynamic gusts acting on the aircraft. Gust load alleviation may include using sensors to detect sudden wind gusts and automatically adjusting one or more control surfaces to reduce an impact of the sudden wind gusts by redistributing one or more loads. In some embodiments, loads may vary depending on one or more of at least one flight condition, an aircraft configuration, or at least one operational maneuver (e.g., active, planned, or commanded).

In some embodiments, load alleviation functions may be configured to lower overall aircraft level maneuver loads and realize structural weight savings by tailoring how forces are generated specifically across the wing and/or propellers. For example, when an aircraft is in hover, load alleviation functions may be configured to initiate a simple roll by commanding a small amount of thrust outboard, commanding a larger amount of thrust inboard, commanding flaperon movement, or a combination thereof. For yaw control in hover, load alleviation functions may be configured to command nacelle tilt (e.g., forward or backward tilt to direct thrust vector to generate yaw moment about the center of gravity (CG)), differential torque on the propellers (e.g., opposite spinning propellers, increase power on clockwise spinning propellers and decrease power on counterclockwise spinning propellers), or a combination of both. As another example, as the aircraft increases speed, load alleviation functions may be configured to command a unique combination of propeller thrust tailored to each propeller location as well as one or more flaperons to initiate a roll. For an aircraft with multiple propellers (e.g., an aircraft with 12 propellers), there may be that many (e.g., 12) sources for the force, which may allow load alleviation functions to choose from different methods to tailor which source and which effector (e.g., set of propellers, flaperons, and/or tail control) to use. Each method may produce different reaction forces on the aircraft and may be tailored to alleviate structural reaction loads.

In some embodiments, load alleviation functions may be configured to specifically control lift distribution across the wing for normal loads to alleviate loads on most of the aircraft structure.

In some embodiments, load alleviation functions may be configured to prioritize structural requirements. Additionally or alternatively, load alleviation functions may be configured to determine an optimized load-reducing approach tailoring how forces are generated across the wing and/or propellers, wherein the optimized load-reducing approach may meet structural requirements and results in a most similar state to a desired aircraft state commanded by the pilot.

In some embodiments, load alleviation functions may be configured for feedforward commands. In some embodiments, a feedforward command configuration may refer to predicting an effect of disturbances based on known relationships and applying corrective actions to minimize the effect. For example, load alleviation functions may comprise a state space model. The state space model may comprise a mathematical model of an aircraft defined by a set of variables (e.g., state variables, input variables, output variables) and a set of differential equations that determine how the variables change over time. In some embodiments, the state space model may be configured to accept candidate effector commands and/or one or more flight conditions as input. A candidate effector command may include one or more possible control inputs to command one or more effectors (e.g., actuators) of the aircraft. For example, a candidate effector command may include one or more possible control inputs (e.g., adjusting speed of one or more propellers, controlling surface deflection of one or more control surfaces) configured to modify a state of the aircraft to alleviate one or more loads. In some embodiments, the state space model may be configured to output a combination of effector commands based on input. Additionally or alternatively, the state space model may be configured to, based on a location of effectors in space, take into consideration a root bending moment at the wing and/or a bending load applied to tail surfaces. For example, when one or more of an aircraft's ruddervators are deflected, the deflection may induce a certain moment based on a geometry of the aircraft. In order to account for such induced moment, the state space model may add the induced moment to a delta force for delta displacement to determine a net bending moment (e.g., delta force to delta root bending moment i.e., how much the root bending moment changes because of changing forces) on the surface. In some embodiments, the state space model may be configured to predict (e.g., simulate) one or more output states (e.g., configurations) of the aircraft based on the different possible commands to effectors (e.g., candidate effector commands) and/or the net bending moment on the surface. Each state of the aircraft may include a delta state for attitude, a delta state for accelerations, and/or an approximation of one or more loads, such as a wing load, a tail load, a landing load, or any other load. In some embodiments, load alleviation functions may be configured to evaluate each candidate effector command of one or more candidate effector commands for load alleviation effectiveness (e.g., minimizing, distributing, or reducing loads) and feasibility (e.g., maintaining desired performance metrics, such as stability or control accuracy). For example, load alleviation functions may be configured to evaluate each candidate effector command by performing simulations (e.g., using simulation model, such as state space model). In some embodiments, the state space model may be a pure feedforward configuration (e.g., permitting only feedforward commands). For example, the state space model may be configured as part of an optimization problem (e.g., performed by control allocation 1029 of FIG. 10) wherein different methods or configurations (e.g., algorithms, functions, and/or variable settings) for alleviating a particular load may each be associated with a particular cost in a cost function of the optimization problem. Based on the associated costs, the FCS may select a method (e.g., optimized configuration) with a lowest cost.

In some embodiments, the state space model may utilize information from feedback sensors. For example, the state space model may be configured to output a predicted state (e.g., optimized configuration) of the aircraft, which the load alleviation functions may compare to an actual state of the aircraft determined based on information from feedback sensors, and may command particular effectors (e.g., inboard versus outboard propellers) accordingly to close a gap between the predicted state (e.g., optimized configuration) and the actual state.

In some embodiments, the state space model may be configured for both feedforward and feedback arrangements (including combinations of both).

Figure 11:
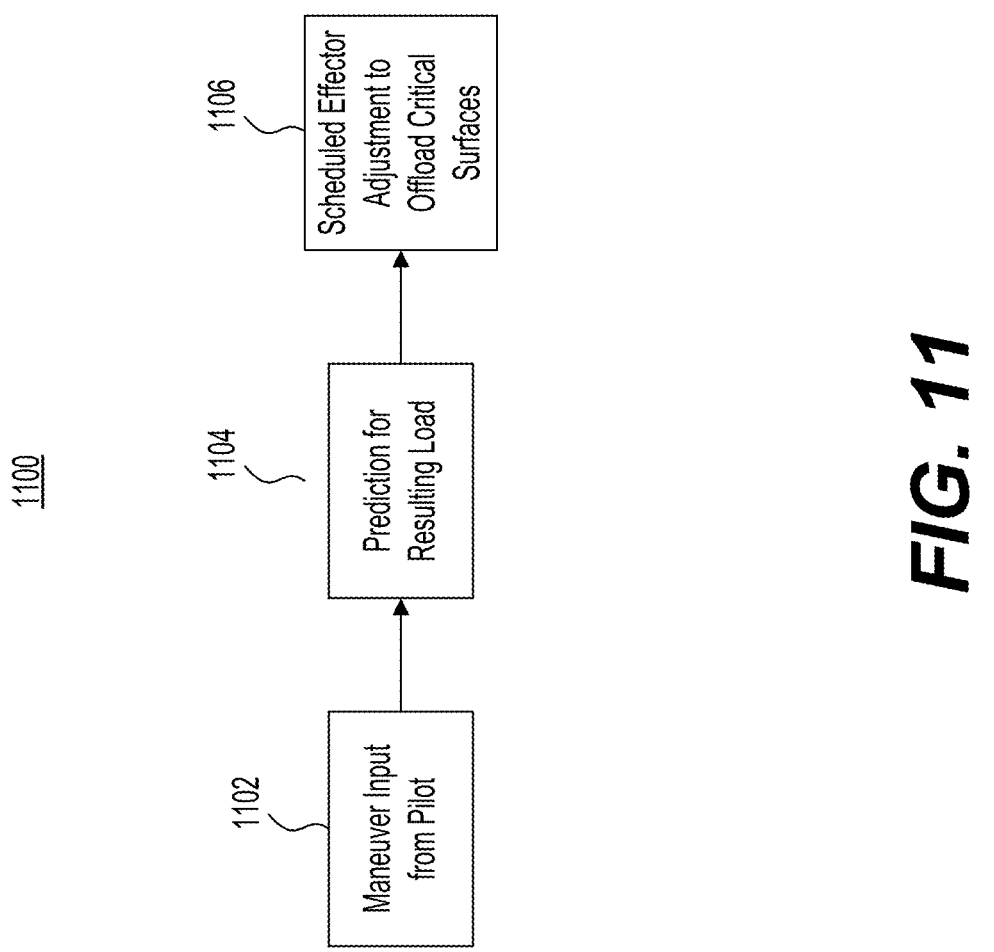
FIG. 11 illustrates a flow diagram of an exemplary method for load alleviation, according to various disclosed embodiments.

FIG. 11 is a flow diagram illustrating an exemplary method 1100 for load alleviation for a particular machine (e.g., an aircraft), according to some embodiments of the present disclosure, thereby improving the technology of aircraft (e.g., aircraft safety, fuel efficiency, payload capacity, structural integrity). In some embodiments, method 1100 may be performed without taking real time feedback into consideration (e.g., open loop load alleviation). The steps of method 1100 may be performable by, for example, system 1000 of FIG. 10 executing on or otherwise using the components of any aircraft of FIGS. 1-8, 9A-9E, 10, 12, 13A-13E, 14A-14B, 15, 16, 17 and/or 18A-18E or any flight control computer (e.g., a computer-implemented method). For example, a flight control computer of the aircraft may be configured to perform one or more steps of method 1100. The steps of method 1100 may be activated or adjusted based on aircraft flight conditions, maneuvers, or operational requirements. It is appreciated that the illustrated method 1100 can be altered to modify the order of steps and to include additional steps.

In step 1102, a flight control computer of the aircraft may receive one or more signals to control movement of the aircraft. For example, the one or more signals may include one or more maneuver inputs from a pilot of the aircraft. Maneuver inputs may include inputs received from one or more pilot input devices (e.g., right inceptor, left inceptor) or received from an autopilot system, such as discussed above with respect to FIG. 10.

In step 1104, the flight control computer may predict one or more resulting moments or loads based on the received one or more signals. For example, the flight control computer may predict one or more bending moments, which may comprise a measure of a bending effect induced in a structural element subjected to external forces, and may be calculated as follows:

$$M = F \times d$$

where:
M bending moment at a point of interest
F applied force (e.g., load) perpendicular distance from the point
d of interest to a location where bending moment is being calculated In some embodiments, predicting one or more resulting bending moments based on the received one or more signals may comprise using one or more aerodynamic models (e.g., mathematical model, state space model) of an aircraft's aerodynamic characteristics to predict a distribution of forces and/or moments on the aircraft during maneuvers. Predicting a bending moment may include determining an expected value (e.g., a value of a most likely bending moment) and/or determining a probability. In some embodiments, predicting one or more resulting bending moments may be based on one or more vehicle dynamics (e.g., aircraft configuration or architecture, flight conditions, forces acting on the aircraft, vehicle dynamics 1030 or vehicle sensing 1031 of FIG. 10). For example, the one or more aerodynamic models may be configured to simulate an airflow around the aircraft and calculate resulting forces or moments based on vehicle dynamics to predict a distribution of aerodynamic loads across an aircraft. In some embodiments, predicting one or more resulting bending moments may comprise using structural analysis techniques to analyze a bending, torsion, and/or shear stresses induced in critical aircraft components. In some embodiments, predicting one or more resulting bending moments may comprise predicting an aircraft response to changes in one or more of flight conditions or control inputs. Such simulation of aircraft responses in different situations may improve an accuracy of predicting resulting bending moments.

In step 1106, the flight control computer may be configured to adjust one or more effectors (e.g., control surfaces, such as elevators, ailerons, flaps, flaperons, rudder, spoiler, engines, rotors, propulsion units, propellers, etc.) based on the predicted one or more resulting bending moments. For example, the flight control computer may be configured to adjust one or more effectors to offload critical structures (e.g., surfaces). In some embodiments, the flight control computer may be configured to adjust the one or more effectors by determining optimized adjustments to redistribute loads to minimize stresses on critical structures. Critical structures may include aircraft components (e.g., wings, rotor/propeller system, fuselage, batteries, control surfaces, motors, tail, actuators, effectors) essential for maintaining structural integrity and performance during various phases of flight (e.g., takeoff, hover, transition to forward flight, landing), and may be designated as such according to a data structure and/or device (e.g., the FCC) and/or may be based on at least one flight condition, as discussed further below. For example, critical structures may experience significant loads, and load alleviation may be crucial for enhancing safety, efficiency, and/or longevity. In some embodiments, based on the prediction indicating excessive bending moments on a particular wing section, the flight control computer may be configured to adjust rotor speeds or control surface deflections to reduce loads on the particular wing. As a result of performing method 1100, structural integrity may be maintained and flight safety improved.

Open-loop load alleviation may rely on predetermined control commands and may not adjust control inputs based on an actual state of the aircraft. For example, the flight control computer may be configured to control the aircraft based on predictions from the one or more aerodynamic models for expected loads under various conditions.

Figure 12:
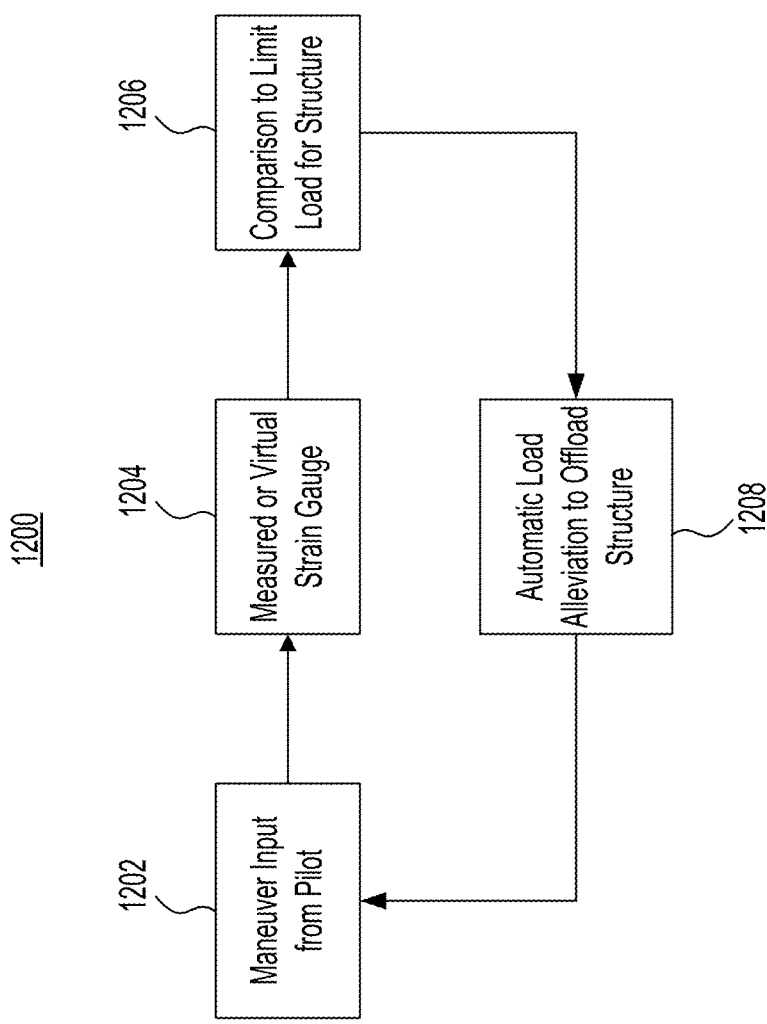
FIG. 12 illustrates a flow diagram of an exemplary method for load alleviation, according to various disclosed embodiments.

FIG. 12 is a flow diagram illustrating an exemplary method 1200 for load alleviation for a particular machine (e.g., an aircraft), according to some embodiments of the present disclosure, thereby improving the technology of aircraft (e.g., aircraft safety, fuel efficiency, payload capacity, structural integrity). In some embodiments, method 1200 may be performed by taking into consideration feedback from sensors or measurements of aerodynamic loads, structural stresses, or aircraft dynamics to continuously adjust control effectors in response to changing conditions (e.g., closed loop load alleviation). The steps of method 1200 may be performable by, for example, system 1000 of FIG. 10 executing on or otherwise using the components of any aircraft of FIGS. 1-8, 9A-9E, 10, 11, 13A-13E, 14A-14B, 15, 16, 17 and/or 18A-18E or any flight control computer (e.g., a computer-implemented method). For example, a flight control computer of the aircraft may be configured to perform one or more steps of method 1200. The steps of method 1200 may be activated or adjusted as needed based on aircraft flight conditions, maneuvers, or operational requirements. It is appreciated that the illustrated method 1200 can be altered to modify the order of steps and to include additional steps.

In step 1202, a flight control computer of the aircraft may receive one or more signals to control movement of the aircraft. For example, the one or more signals may include one or more maneuver inputs from a pilot of the aircraft. Maneuver inputs may include inputs received from one or more pilot input devices (e.g., right inceptor, left inceptor) or received from an autopilot system, such as discussed above with respect to FIG. 10.

In step 1204, the flight control computer may determine at least one strain experienced by one or more critical structures. In some embodiments, one or more sensors of the aircraft may be configured to measure the at least one strain (e.g., one or more loads) experienced by critical structures.

Optionally, one or more virtual strain gauges (e.g., mathematical model, simulator, etc.) may be configured to estimate strain based on inputs (e.g., airspeed, acceleration, control surface deflections, flight conditions, etc.).

In step 1206, the flight control computer may compare the determined strain to one or more predefined load limits (e.g., structural thresholds). In some embodiments, the one or more predefined load limits may comprise maximum loads that the aircraft's structure can withstand without risk of damage or structural failure.

Optionally, the one or more predefined load limits may be determined during an aircraft's design or certification process.

In step 1208, the flight control computer may alleviate loads on the aircraft based on the comparison. For example, a determination that at least one strain exceeds one or more predefined load limits may indicate that at least one part of the structure (e.g., aircraft component, critical structure) is being overloaded with a load and corrective action is necessary to alleviate the load. In some embodiments, the flight control computer may be configured to automatically adjust one or more of the aircraft configuration, control surface deflections, or propulsion settings to rebalance loads and offload the overloaded structure (e.g., corrective action). Optionally, the flight control computer may be configured to redistribute one or more aerodynamic forces by adjusting control surface deflections, varying engine thrust settings, altering the aircraft's attitude or flight path, or a combination thereof.

Closed loop load alleviation may comprise continuously monitoring loads (e.g., aerodynamic loads, weight loads, engine loads, structural loads, dynamic loads, etc.) and adjusting the aircraft's configuration (e.g., in real time) to ensure that a structural integrity of the aircraft is maintained within safe limits throughout flight.

Figure 13A:
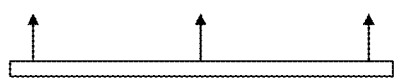
FIGS. 13A-13E illustrate exemplary approaches for load alleviation, according to various disclosed embodiments.
Figure 13A:
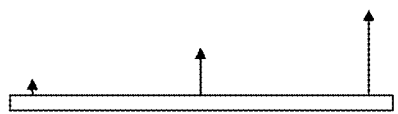
Figure 13A:
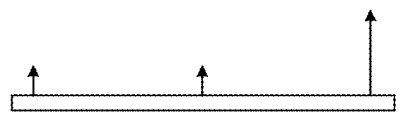

FIG. 13A is a diagram illustrating exemplary approaches 1300a, according to some disclosed embodiments. Each approach depicts a simplified diagram of thrust output (e.g., commanded thrust) at three propellers on a left wing of the aircraft, wherein each arrow represents an amount of thrust associated with a propeller. In these examples, the total thrust levels for each approach is equivalent, and each approach would keep the aircraft in the air in the same place. Avg approach 1310a depicts three propellers with an equal thrust level for each propeller, tailored approach 1310b depicts three propellers with different thrust levels for each propeller, and tailored approach w/constraints 1310c depicts three propellers where two propellers have equal thrust levels and one propeller has a different thrust level. In some embodiments, 1310b may be the most optimized approach of the three that would create significantly lower bending moments than, for example, 1310a. 1310c depicts three propellers with different thrust levels for each propeller determined based on a constraint, such as requiring a minimum RPM on each propeller or specifying a time that each propeller is allowed to perform at max force. 1310c may be an exemplary approach that would create significantly lower bending moments than 1310a while taking constraints into consideration. For example, bending moments can be determined as follows:

$$F_{outboard} \times BL_{outboard} = M0_{F_{out}}$$

$$F_{mid} \times BL_{mid} = M0_{F_{mid}}$$

$$F_{inboard} \times BL_{inboard} = M0_{F_{in}}$$

where:
$F_{outboard}$ integrated outboard propeller force
$F_{mid}$ integrated middle propeller force
$F_{inboard}$ integrated inboard propeller force
$BL_{outboard}$ buttline outboard i.e., distance of $F_{outboard}$ laterally from midline (XZ plane of symmetry)
$B_{mid}$ buttline mid (distance of $F_{mid}$ laterally from midline)
$BL_{inboard}$ buttline inboard (distance of $F_{inboard}$ laterally from midline)
$M0_{F_{out}}$, $M0_{F_{mid}}$, $M0_{F_{in}}$ root moments In some embodiments, load alleviation functions may calculate a sum of the determined root moments (e.g., $M0_{F_{out}} + M0_{F_{mid}} + M0_{F_{in}}$) to determine an approximation for a root bending moment. In some embodiments, load alleviation functions may be configured to set a maximum allowable root bending moment. Based on the set maximum allowable root bending moment, the flight control system may be configured to control propeller forces such that the approximation for a root bending moment stays under the maximum allowable root bending moment. In some embodiments, load alleviation functions may be configured to set a different maximum allowable root bending moment for each flight configuration (e.g., for each phase of flight (e.g., hover, cruise, etc.), for each flight maneuver (e.g., roll, pitch, yaw, etc.)).

In some embodiments, load alleviation functions may be configured to set a maximum allowable root bending moment equal to an absolute allowable root bending moment. In some embodiments, load alleviation functions may be configured to set a maximum allowable root bending moment to be a predetermined value less than an absolute allowable root bending moment. Doing so may limit flight control system commands to size down the structure of the aircraft, which may result in structural savings as well as weight savings.

In some embodiments, load alleviation functions may be configured to modify trim states and control authority required from the tail. For example, tail loads may be significant drivers of aircraft weight. Being so far aft, tail loads may affect CG calculations more than inboard weight and may drive weight into landing gear and aft fuselage.

In addition, tail loads may drive up other aerodynamic surface sizing. For over-actuated aircraft such as aircraft of the present disclosure, load alleviation functions may be configured to modify trim states and control authority required from the tail to drive down sizing. In some embodiments, load alleviation functions may be configured to feed-forward shape control inputs that drive displacements into tail controls. For example, lower rates may result in lower accelerations, which may drive lower loads.

In some embodiments, load alleviation functions may be configured to perform RPM tailoring. In some embodiments, RPM tailoring may include determining an RPM of at least one (e.g., one, multiple, or each) propeller to tailor wing distribution lift (e.g., to a particular distribution and/or total lift). For example, if a propeller wash were to impact the tail, load alleviation functions may tailor the RPM to reduce loads.

In some embodiments, such as for aircraft configurations where there are propellers spinning in front of the wing, the configuration may distort the lift on the wing. In order to reduce loads for such configurations, load alleviation functions may be configured to tailor a spinning speed of each propeller at each location to tailor wing distribution lift.

In some embodiments, load alleviation functions may define absolute and non-absolute load limits. For example, an absolute load limit may comprise a max load for the root bending moment. When an aircraft is approaching an absolute load limit, load alleviation functions may focus on not exceeding the absolute load limit with highest priority. When the aircraft is not approaching the absolute load limit (e.g., when the aircraft is cruising in steady flight), load alleviation functions may be configured to enter a low load configuration to minimize loads that are preferably minimized. Additionally or alternatively, when the aircraft is not approaching the absolute load limit, load alleviation functions may be configured to allow the aircraft to exceed certain loads (e.g., non-absolute loads) for a limited period of time to accomplish certain maneuvers demanded by the pilot, such as to return the aircraft to a steady state.

Figure 13B:
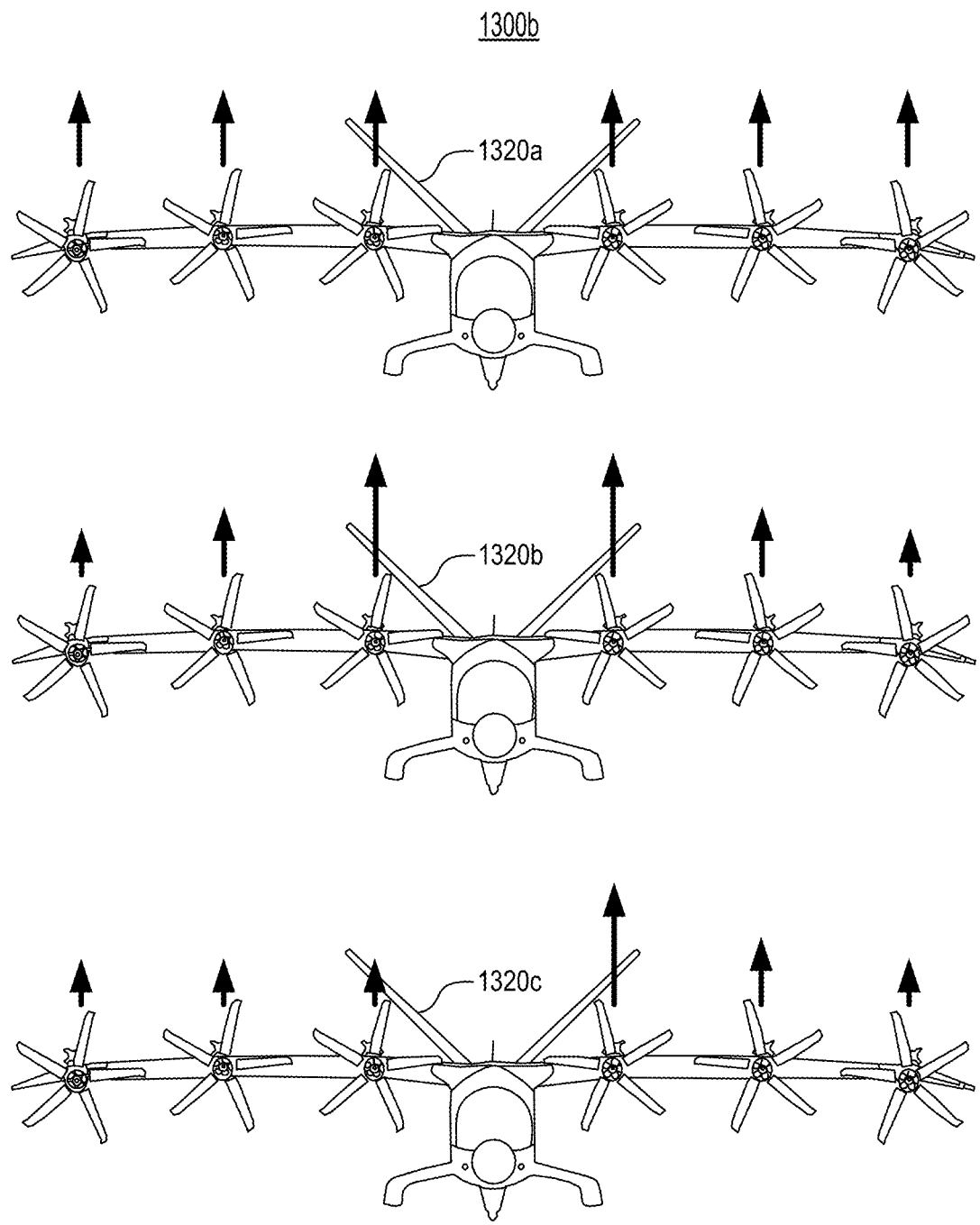

FIG. 13B is a diagram illustrating exemplary approaches 1300b, consistent with disclosed embodiments. Each approach 1320a, 1320b and 1320c depicts a simplified forward view of an aircraft, wherein each arrow represents a thrust level associated with one or more propellers on a wing of the aircraft. 1320a depicts an exemplary approach in a typical normal or roll maneuver, wherein there is an average thrust distribution between the propellers of the wing. 1320b depicts an exemplary load-reduced approach in a normal maneuver, wherein loads are biased inboard to reduce root bending moment. 1320c depicts an exemplary load-reduced approach in a roll maneuver. In some embodiments, depicted approach 1320c may include using propellers or flaperons or a combination of both based on airspeed. In some embodiments, 1320c may comprise using a combination of tilt propellers, lift propellers, and flaperons.

Figure 13C:
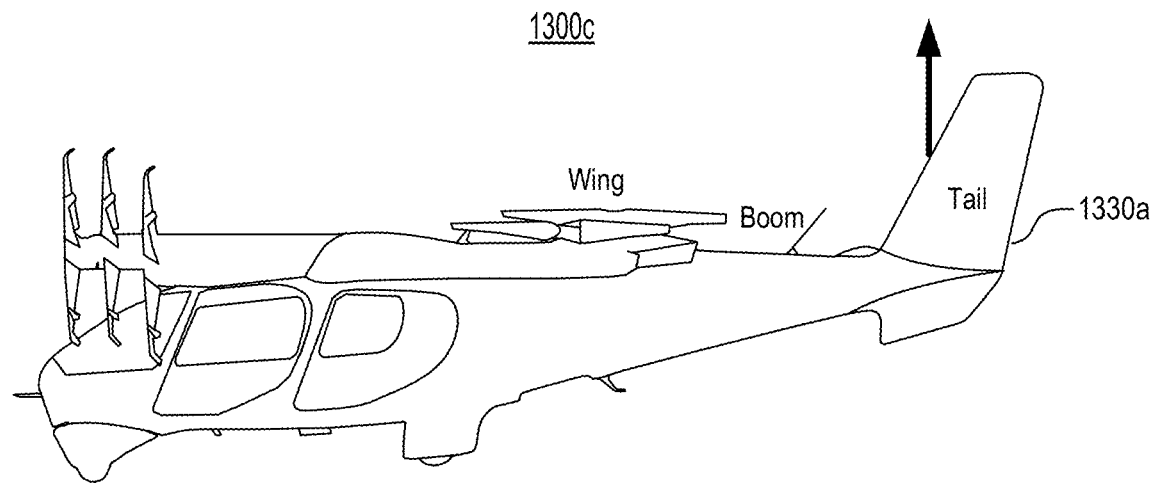
Figure 13C:
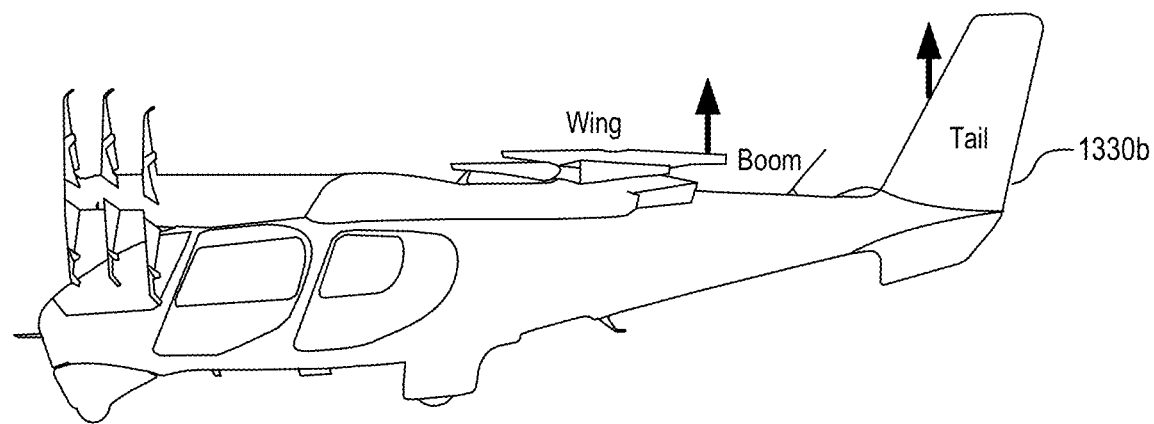

FIG. 13C is a diagram illustrating exemplary approaches 1300c, consistent with disclosed embodiments. Each approach 1330a and 1330b depicts a simplified side view of an aircraft, wherein each arrow represents an amount of force generated by surfaces (e.g., boom force, tail force) to counteract aerodynamic moments. 1330a depicts an exemplary approach in a typical pitch maneuver, wherein only tail force is used. 1330b depicts an exemplary load-reduced approach in a pitch maneuver, wherein there is less tail load by using flaperons and/or aft propellers to generate pitch.

Figure 13D:
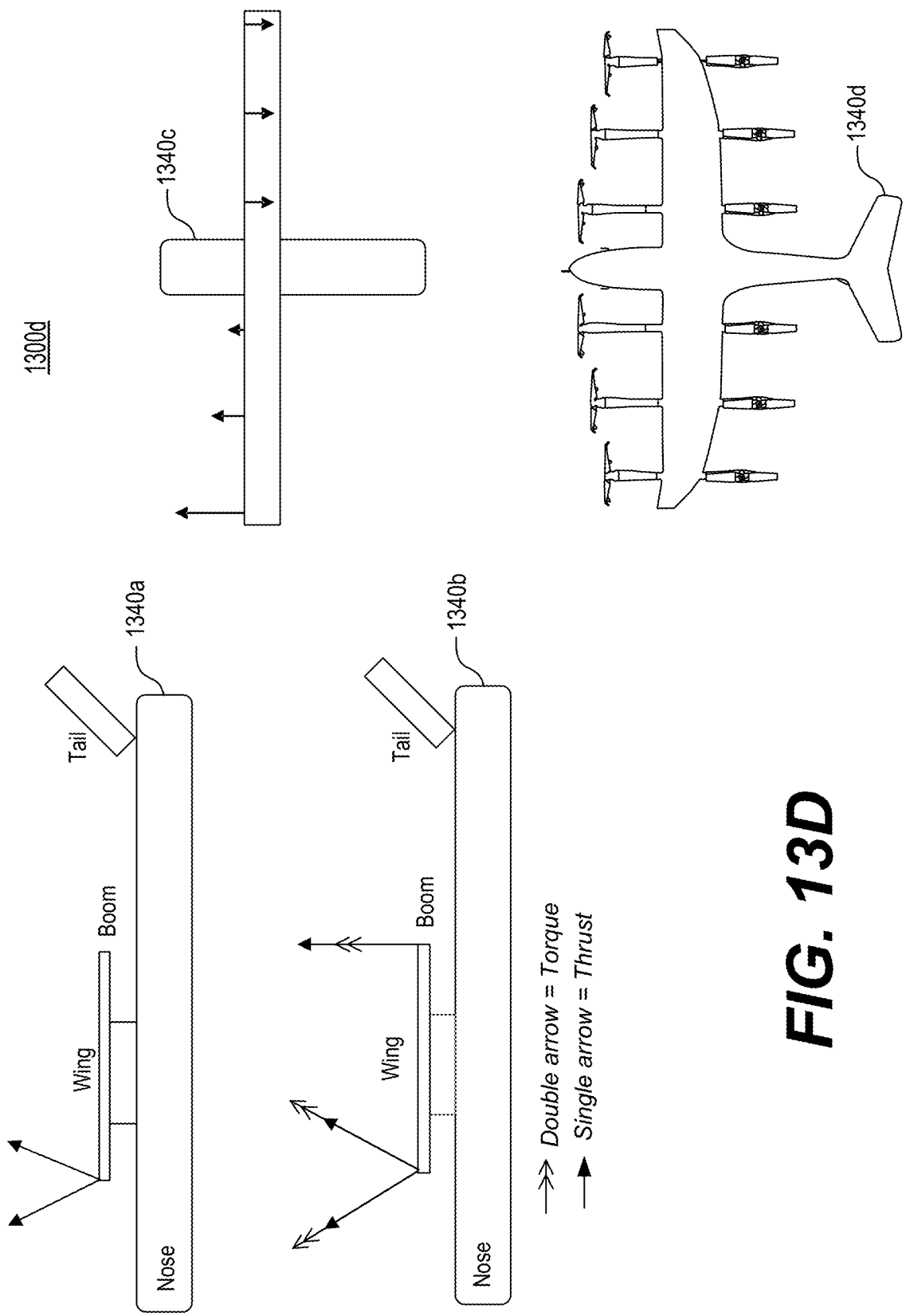

FIG. 13D is a diagram illustrating exemplary approaches 1300d, consistent with disclosed embodiments. 1340a and 1340b each depict a simplified side view of an aircraft and 1340c depicts a simplified top view of an aircraft, such as aircraft 1340d. 1340a depicts an exemplary approach in a typical yaw maneuver in a hover phase of flight, which may be accomplished by using differential tilt on nacelles to affect a moment about the CG and/or by exclusively using differential torque for counter-rotating rotors. 1340b depicts an exemplary load-reduced approach in a yaw maneuver in a hover phase of flight, wherein differential tilt propellers and differential torque on counter-rotating propellers may reduce wing bending loads. 1340c depicts an exemplary load-reduced approach in a yaw maneuver in a hover phase of flight, wherein using a unique combination of forward and aft tilts of the propellers may optimize yaw performance and load reduction on the local structure.

Figure 13E:
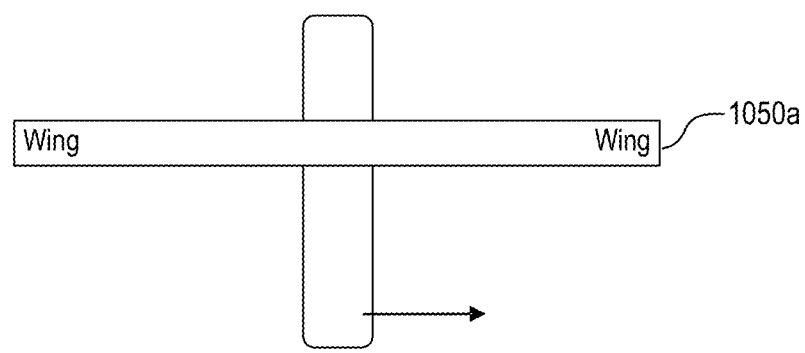
Figure 13E:
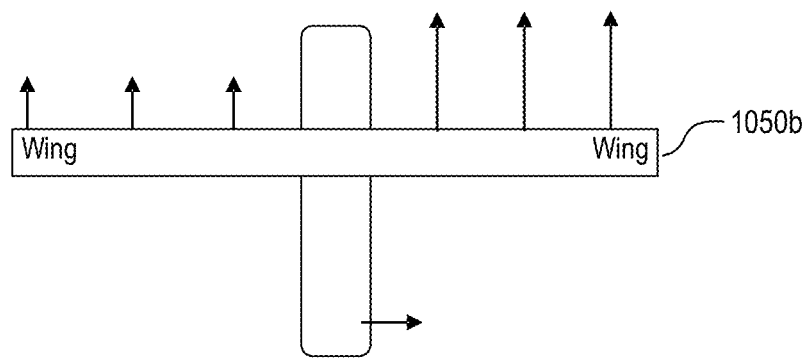
Figure 13E:
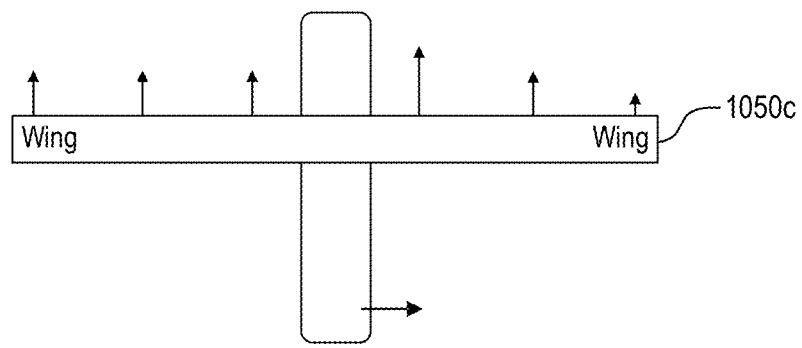

FIG. 13E is a diagram illustrating exemplary approaches 1300e, consistent with disclosed embodiments. Each approach 1350a, 1350b and 1350c depicts a simplified top view of an aircraft (e.g., 1340d of FIG. 13D). 1350a depicts an exemplary approach in a typical yaw maneuver in a forward phase of flight, wherein only rudder force is used. 1350b depicts an exemplary load-reduced approach in a yaw maneuver in a forward phase of flight using propeller differential thrust and/or lower rudder force to reduce tail load. 1350c depicts an exemplary load-reduced approach in a yaw maneuver in a forward phase of flight using propeller differential thrust, lower rudder force to reduce tail load, and/or a combination of load share forces.

In some embodiments, load alleviation functions may be configured to reduce gyroscopic loads. Most large fly-by-wire airplanes use hydraulic actuators which may be capable of holding position with little to no power input. However, aircrafts utilizing electric actuators may be more prone to back driving than hydraulic actuators. For example, electric actuators may require expending energy to hold against a load, and can thus lead to overheating and/or damaging the actuators if not managed, especially for tilting propellers associated with significant gyroscopic loads at certain angles and certain aircraft maneuvers. To prevent such damage to the actuators or structure connected to the actuators, the one or more load alleviation functions may be configured to determine body rate limits such that gyroscopic loads do not exceed the capabilities (e.g., physical limits) of the actuators and/or structure connected to the actuators.

Figure 14A:
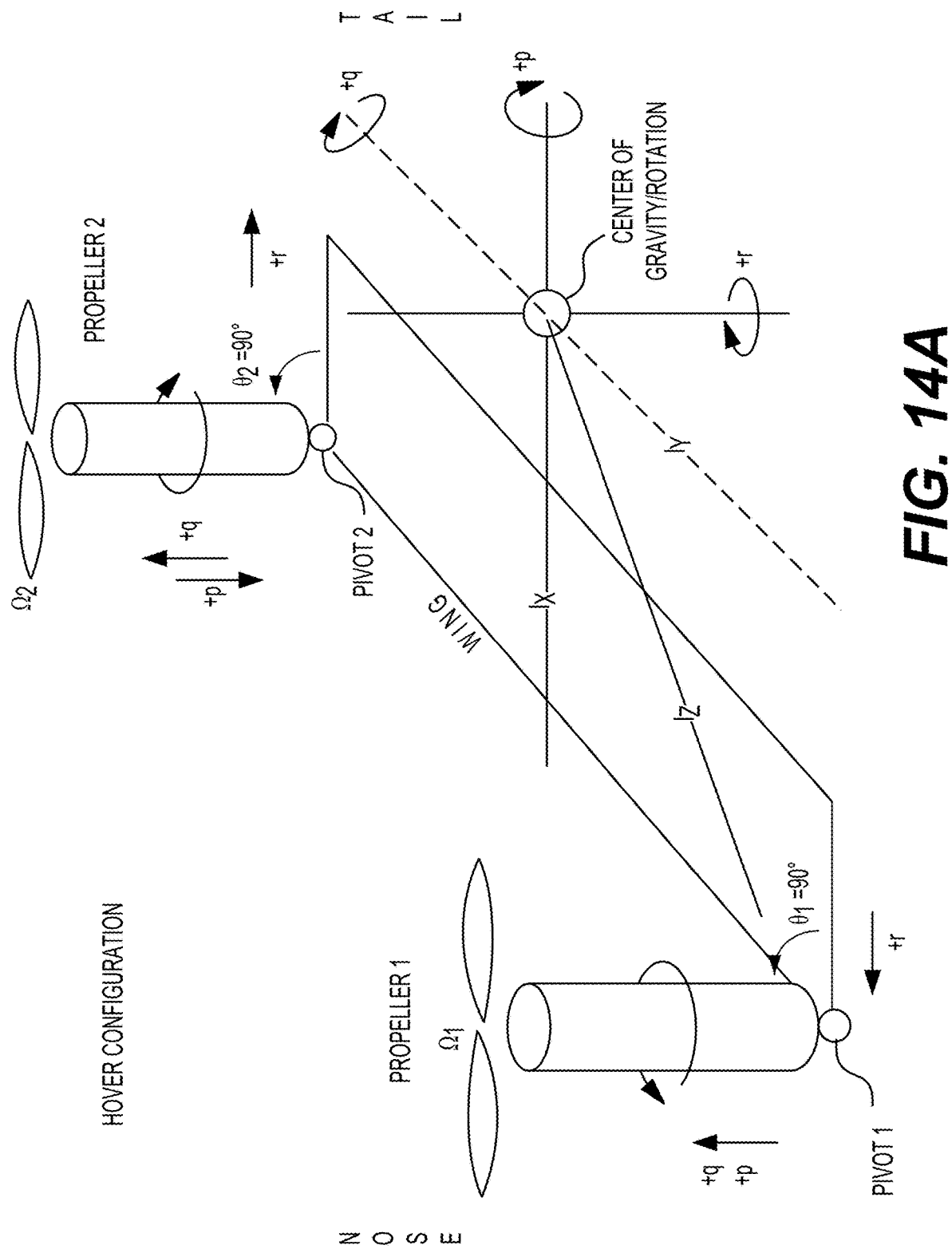
FIGS. 14A-14B illustrate exemplary configurations in different phases of flight, according to various disclosed embodiments.

FIG. 14A illustrates an exemplary configuration of an aircraft in a hover phase of flight, consistent with disclosed embodiments. The aircraft is depicted such that the nose/front of the aircraft is on the left and the tail/back of the aircraft is on the right. The exemplary configuration depicts two outer tilter propellers (other propellers of the aircraft are not shown for purposes of simplicity) in an upright position (e.g., perpendicular to the wing) and attached near the tips of a wing via pivot point 1 and pivot point 2. At each pivot point, one or more electric actuators as well as the aircraft structure connected to the one or more electric actuators may be configured to handle a load through the pivot point. The load alleviation function may be configured to cause the aircraft and/or aircraft components to avoid reaching one or more moments at the pivot point that exceed one or more predetermined thresholds.

In some embodiments, a roll maneuver may involve vertical rotational motions for both propellers such that the vertical rotational motion of propeller 1 is opposite the vertical rotational motion of propeller 2 (e.g., up arrow for +p for propeller 1, down arrow for +p for propeller 2). A pitch maneuver may involve the same vertical rotational motion for both propellers (i.e., up arrow for +q for both propellers). A yaw maneuver may comprise moving propeller 1 in a horizontal direction towards one end of the airplane and moving propeller 2 in a horizontal direction towards the other end of the airplane (i.e., arrow in the direction of the nose for +r for propeller 1, arrow in the direction of the tail for +r for propeller 2).

For a pitch maneuver and/or roll maneuver in the hover phase of flight, rotational motion of the propeller may be along the same axis as torque, resulting in minimal moment at the pivot points. Thus, in some embodiments, there may be no need to limit pitch and/or roll rate for gyroscopic load alleviation in the hover phase of flight. However, for a yaw maneuver in the hover phase of flight, rotational motion of the propeller may not be in the same direction as torque, resulting in a force and/or moment that may be desirable to counteract by the electric actuators or a structure containing the electric actuators. Therefore, in some embodiments, the flight control system may be configured to limit yaw rate for gyro load alleviation in the hover phase of flight.

Figure 14B:
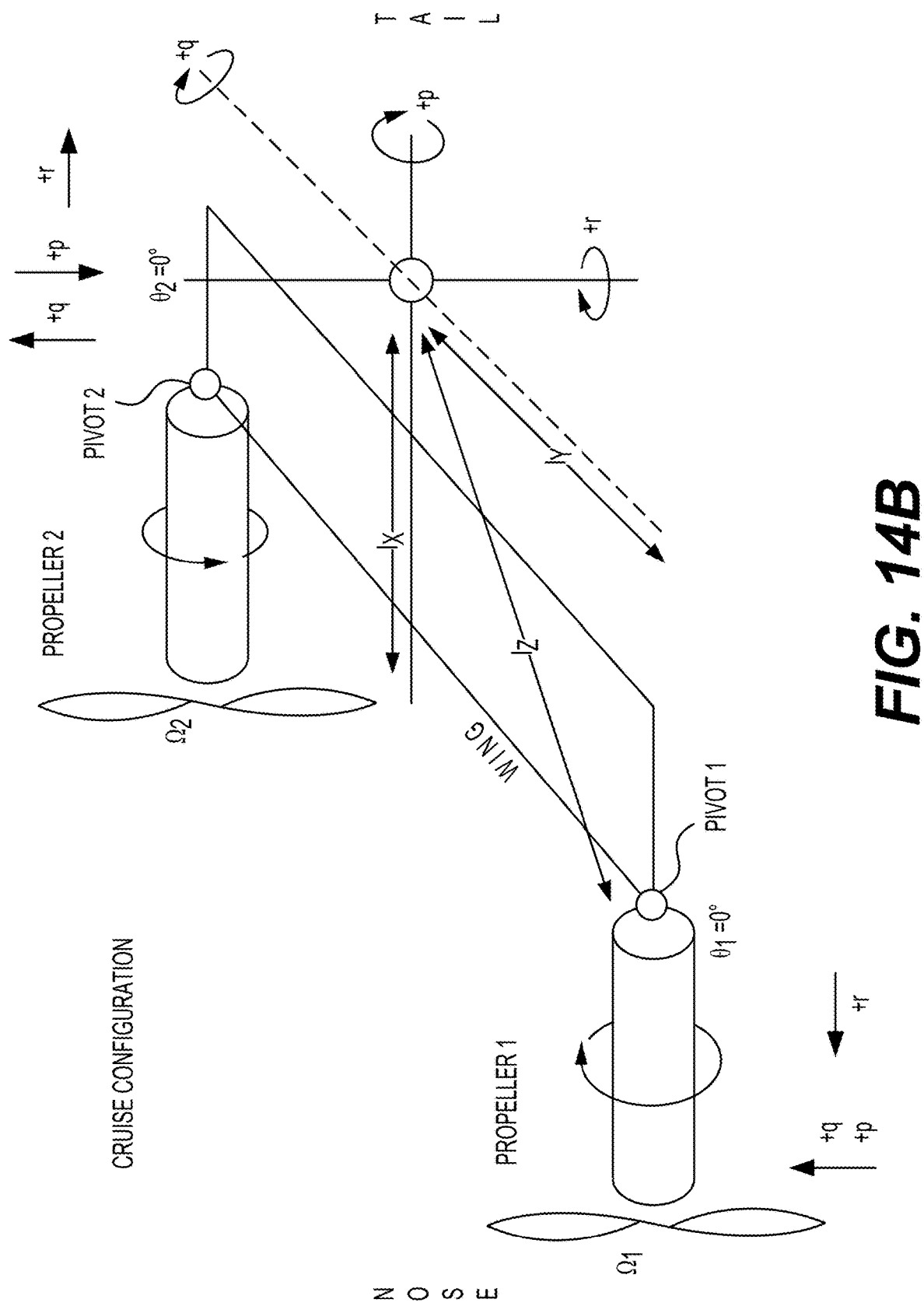

FIG. 14B illustrates an exemplary configuration of an aircraft in a cruise phase of flight, consistent with disclosed embodiments. The aircraft is depicted such that the nose/front of the aircraft is on the left and the tail/back of the aircraft is on the right. The exemplary configuration depicts two outer tilter propellers (other propellers of the aircraft are not shown for purposes of simplicity) in a tilted position (e.g., parallel to the wing) and attached near the tips of a wing via pivot point 1 and pivot point 2. At each pivot point, one or more electric actuators as well as the aircraft structure connected to the one or more electric actuators may be configured to handle a load through the pivot point. The one or more load alleviation functions may be configured to prevent moments at the pivot point from exceeding one or more predetermined thresholds.

In some embodiments, a roll maneuver may involve vertical rotational motions for both propellers such that the vertical rotational motion of propeller 1 is opposite the vertical rotational motion of propeller 2 (e.g., up arrow for +p for propeller 1, down arrow for +p for propeller 2). A pitch maneuver may involve the same vertical rotational motion for both propellers (e.g., up arrow for +q for both propellers). A yaw maneuver may comprise moving propeller 1 in a horizontal direction towards one end of the airplane and moving propeller 2 in a horizontal direction towards the other end of the airplane (e.g., arrow in the direction of the nose for +r for propeller 1, arrow in the direction of the tail for +r for propeller 2).

For a yaw maneuver in the cruise phase of flight, rotational motion of the propeller may be along a same axis as torque, resulting in minimal moment at the pivot points. Thus, in some embodiments, there may be no need to limit yaw rate for gyro load alleviation in the cruise phase of flight.

However, for a pitch maneuver and/or roll maneuver in the cruise phase of flight, rotational motion of the propeller may not be in the same direction as torque, resulting in a force and/or moment that may be desirable to counteract by the electric actuators or a structure containing the electric actuators. Therefore, in some embodiments, the flight control system may be configured to limit pitch rate and/or roll rate for gyro load alleviation in the cruise phase of flight.

In some embodiments, in order to prevent a resultant force and/or moment on an actuator and/or aircraft structure from exceeding a level that could damage the actuator and/or aircraft structure, the flight control system may be configured to determine body rate limits (e.g., roll rate limit, pitch rate limit, yaw rate limit) for each body rate (e.g., roll rate, pitch rate, yaw rate), wherein the body rate limit may be a maximum body rate, and wherein exceeding the maximum body rate may result in damaging the actuator and/or aircraft structure.

Figure 15:
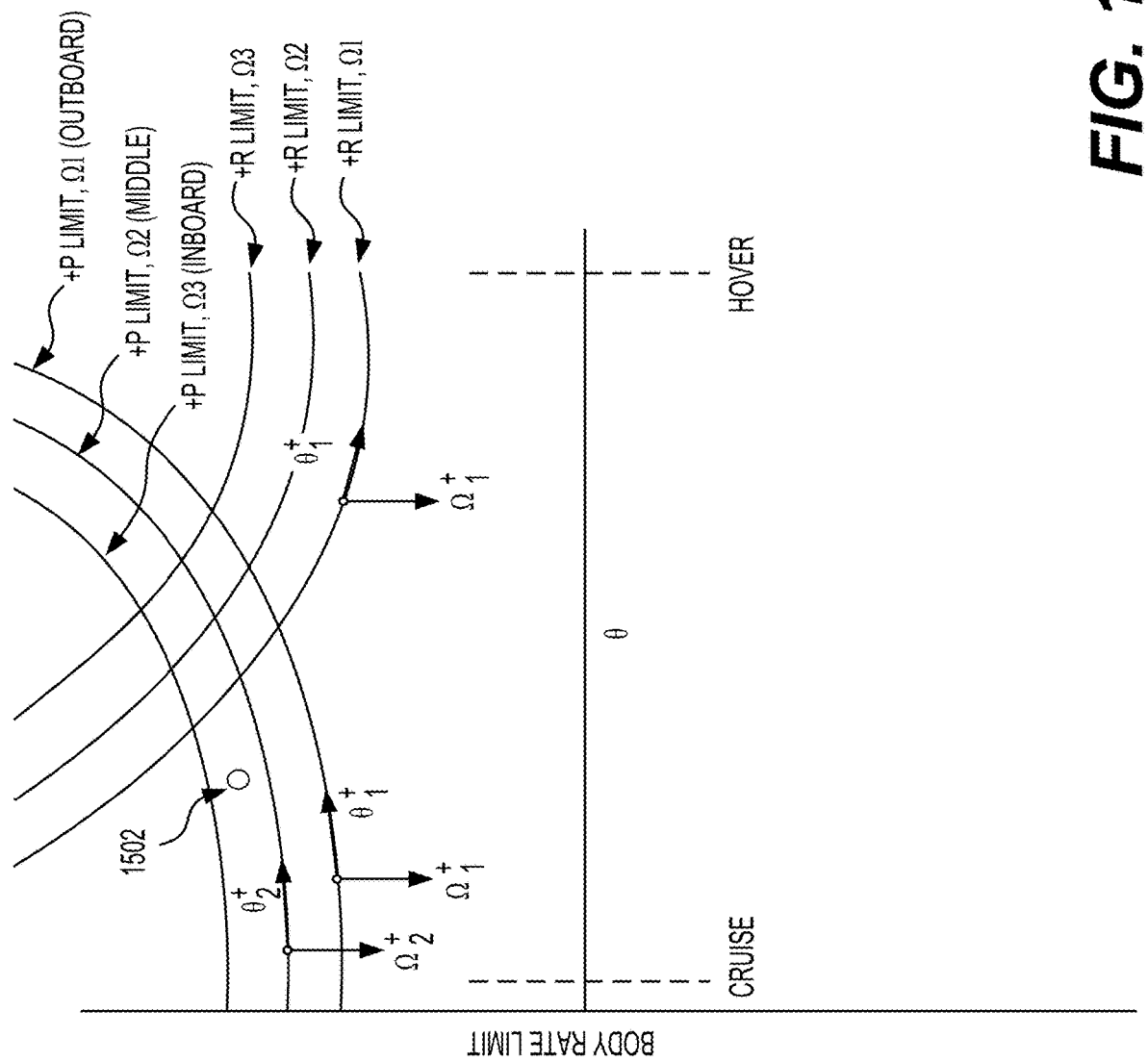
FIG. 15 illustrates exemplary body rate limits for load alleviation, consistent with disclosed embodiments.

FIG. 15 illustrates exemplary body rate limits at different phases of flight for gyro load alleviation, consistent with disclosed embodiments. For purposes of simplicity, body rate limits for only three propellers (outboard, middle and inboard) on one side of the wing are shown. In some embodiments, body rate limits for the three propellers on the opposite side of the wing may be symmetric to the body rate limits shown. In some embodiments, the body rate limits shown may correspond to propellers spinning at a constant RPM.

Optionally, the body rate limits shown may correspond to one or more fixed actuator moment limits. Additionally or alternatively, the body rate limits shown may correspond to structural and/or thermal limits of an actuator. As previously discussed, as the aircraft approaches the hover phase of flight, permitted roll rate may become effectively unlimited due to minimal moment at the actuator associated with the hinge/pivot point of the engine. On the other hand, permitted yaw rate may be effectively unlimited at cruise, but may be increasingly limited as the aircraft approaches the hover phase of flight.

In some embodiments, pitch rate limits (not shown) may be similar to the roll rate limits. Additionally or alternatively, pitch rate limits may be less limiting than roll rate limits. In some embodiments, a positive body rate (e.g., positive roll rate as shown) above its corresponding limit line (e.g., +p limit) may indicate a state of flight that exceeds actuator limits while a positive body rate below its corresponding limit line may indicate a state of flight respecting actuator limits (e.g., for the lines shown). For example, a roll rate at point 1502 may indicate a state of flight that exceeds actuator limits for the middle and outboard propellers, which may damage the actuators connected to the middle and outboard propellers, but the roll rate may be within the actuator limits for the inboard propellers. On the other hand, a negative body rate (e.g., negative roll rate not shown) below its corresponding limit line (e.g., −p limit) may indicate exceeding actuator limits while a negative body rate above its corresponding line may indicate respecting actuator limits.

In some embodiments, the flight control system may be configured to dynamically determine body rate limits based on an RPM associated with each propeller and/or a tilt angle (i.e., based on phase of flight) associated with each propeller. In some embodiments, based on the propellers spinning at a different RPM, the body rate limit lines may dynamically shift up or down (e.g., increasing RPM $\Omega_1^+$ may shift the +p limit for the outboard propeller down).

Optionally, the flight control system may be configured to dynamically determine body rate limits based on spinning propellers. Additionally or alternatively, body rate limits may correspond to one or more fixed actuator moment limits. Additionally or alternatively, the one or more fixed actuator moment limits may be determined based on one or more mechanical brakes. For example, one or more mechanical brakes being engaged may correspond to higher actuator moment limits than when the one or more mechanical brakes are not engaged.

In some embodiments, the outboard propellers may be associated with the most restrictive body rate limits. This may be due to the outboard propellers being located near the tips of the wing, and thus the furthest from the center of gravity/rotation of the aircraft compared to the inboard and middle propellers.

Figure 16:
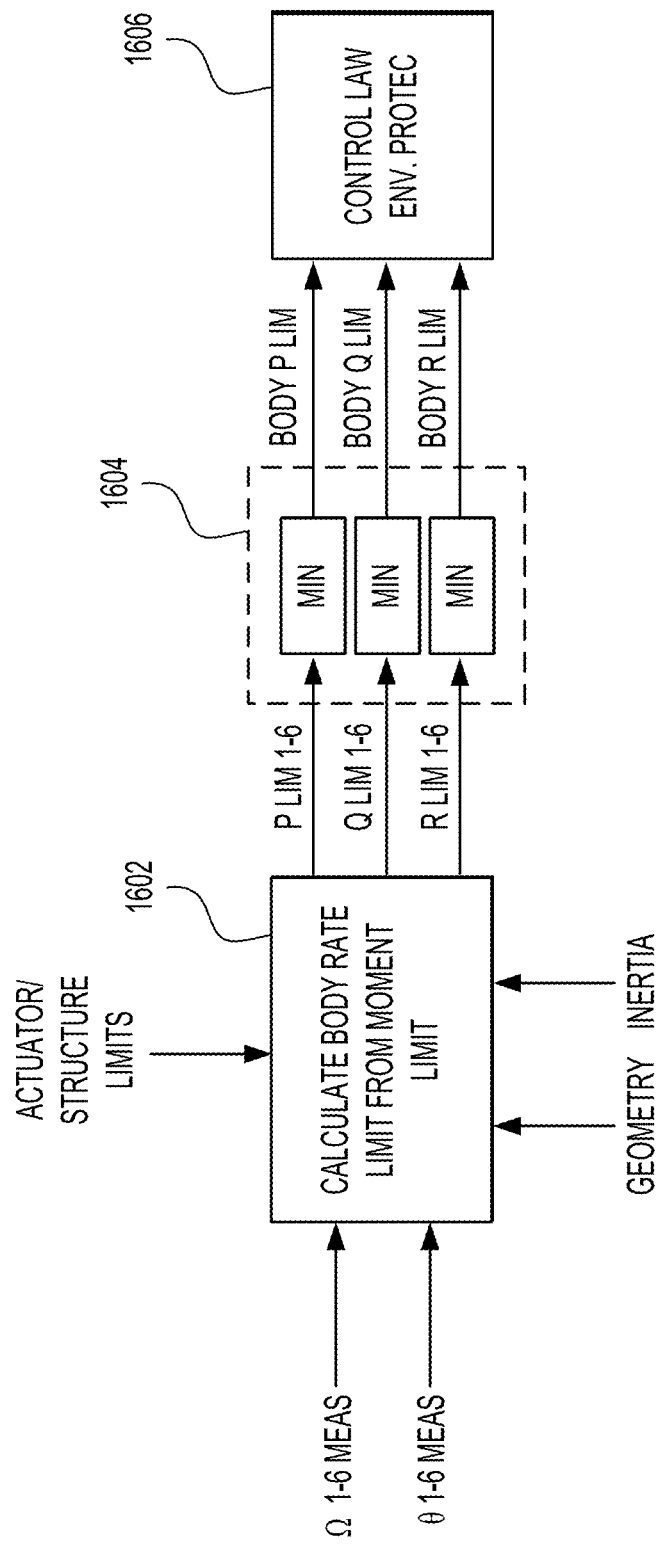
FIG. 16 illustrates a block diagram of an exemplary method for load alleviation, consistent with disclosed embodiments.

FIG. 16 is a functional block diagram of an exemplary gyro load alleviation method, which one or more load alleviation functions of the flight control system may be configured to perform, consistent with disclosed embodiments.

At block 1602, the one or more load alleviation functions may calculate one or more body rate limits. For example, the one or more load alleviation functions may calculate one or more body rate limits based on one or more moment limits (e.g., fixed actuator moment limits). In some embodiments, the one or more load alleviation functions may calculate one or more body rate limits for each propeller. Additionally or alternatively, the one or more load alleviation functions may calculate one or more body rate limits based on one or more propeller properties (e.g., a measured RPM of each propeller of one or more propellers (e.g., measured RPM of each tilter propeller, measured RPM of each lifter propeller, measured RPM of each propeller of a subset of propellers, measured RPM of all propellers, etc.), a tilt angle of the one or more propellers, an angular velocity vector of each propeller, gyroscopic torque generated by each propeller), control authority (e.g., maximum torque that the aircraft's control systems can exert, such as to counteract disturbances), actuator/structure limits (e.g., a predetermined moment for a pivot point to tolerate), a geometry of the aircraft (e.g., location of each propeller on the vehicle), one or more mass properties of the aircraft, and/or an inertia information (e.g., of each propeller of the one or more propellers). For example, when an aircraft rotation vector is parallel with a propeller rotation vector, there may be no resulting limitation on aircraft maneuverability due to no moment being generated. As a result, there may be no structurally driven aircraft yaw-rate limit for a vertically oriented propeller. However, a pure aircraft roll may result in a pitching moment on a tilt actuator for the vertically oriented propeller, and one or more load alleviation functions may be configured to limit roll-rate based on an integrity of the tilt actuator. Additionally or alternatively, a pure aircraft pitch may cause a rolling moment in a structure holding one or more engines (e.g., booms), and one or more load alleviation function may be configured to limit pitch-rate based on one or more properties of the structure.

In some embodiments, the output of block 1602 may be one or more roll rate limits, pitch rate limits, and/or yaw rate limits. In some embodiments, the one or more load alleviation functions may be configured to calculate one or more body rate limits such that a total gyroscopic torque (e.g., sum of torque generated by spinning propellers) does not exceed a maximum available control torque (e.g., maximum torque exerted by aircraft's control systems to counteract gyroscopic torque). Additionally or alternatively, one or more load alleviation functions may be configured to apply one or more safety margins to the calculated one or more body rate limits. Doing so may account for uncertainties or dynamic conditions. In some embodiments, the flight control system may validate the calculated one or more body rate limits through simulation to ensure that the aircraft can handle gyroscopic loads within the one or more body rate limits without compromising stability or control.

In some embodiments, the one or more load alleviation functions may calculate one or more body rate limits as follows:

$$M^b = (I_{prop}\Omega_{prop}^b) \times (\omega_{aircraft}^b)$$

where:
$M^b$ 3D moment that must be reacted by a structure holding a rotating engine/propeller
$I_{prop}$ scalar inertia of rotating propeller/engine components
$\Omega_{prop}^b$ 3D vector describing rotational speed of engine/propeller
$\omega_{aircraft}^b$ 3D vector describing rotational speed of aircraft In some embodiments, $M^b$ may comprise a three-dimensional moment to be reacted by a structure holding a rotating component (e.g., engine or propeller). In some embodiments, MD may be associated with (e.g., expressed in) an aircraft body frame. An aircraft body frame may comprise a reference frame (e.g., fixed to and moving with the aircraft) to describe the aircraft's motion, orientation, forces and/or moments acting upon the aircraft body frame relative to the aircraft. In some embodiments, one or more load alleviation functions may calculate $M^b$ as a cross product of $(I_{prop}\Omega_{prop}^b)$ and $(\omega_{aircraft}^b)$. In some embodiments, minimum and/or maximum values of $M^b$ may be defined based on one or more predetermined structural or actuator limits.

In some embodiments, $I_{prop}$ may comprise a scalar inertia. For example, $I_{prop}$ may comprise a scalar inertia of one or more rotating components (e.g., engine or propeller). Additionally or alternatively, $I_{prop}$ may comprise a constant value. For example, $I_{prop}$ may comprise a rotational inertia of one or more propulsion units (e.g., electric propulsion unit).

In some embodiments, $\Omega_{prop}^b$ may comprise a three-dimensional vector describing rotational speed of one or more rotating components (e.g., engine or propeller). In some embodiments, $\Omega_{prop}^b$ may describe rotational speed of the rotating component in the aircraft body frame. In some embodiments, one or more load alleviation functions may determine $\Omega_{prop}^b$ based on one or more measurements of propeller speed or tilt angle. In some embodiments, such as for each tilt propeller, the one or more load alleviation functions may determine $\Omega_{prop}^b$ as a function of one or more of a variable nacelle tilt angle, a fixed mounted cant angle (e.g., constant tilt angle of propeller's axis relative to one or more of aircraft's principal axes, such as longitudinal, lateral, vertical), or a rotational speed of the tilt propeller. In some embodiments, such as for each fixed propeller (e.g., lift propeller), a direction of $\Omega_{prop}^b$ may be constant. Additionally or alternatively, one or more load alleviation functions may determine a magnitude of $\Omega_{prop}^b$ for each fixed propeller based on a rotational speed of the fixed propeller.

In some embodiments, $\Omega_{aircraft}^b$ may comprise a three-dimensional vector describing a rotational speed of the aircraft. For example, $\Omega_{aircraft}^b$ may comprise a three-dimensional vector [p, q, r] describing a rotational speed of the aircraft [roll-rate, pitch-rate, yaw-rate] in its body-axis (e.g., of the aircraft body frame).

In some embodiments, the one or more load alleviation functions may calculate one or more body rate limits by solving $M^b=(I_{prop}\Omega_{prop}^b)\times(\Omega_{aircraft}^b)$ for maximum/minimum values of one or more of roll-rate, pitch-rate, or yaw-rate, for example, such that MD limits are respected.

In some embodiments, the one or more load alleviation functions may be configured to calculate one or more body rate limits by using motion only in one axis at a time (e.g., assuming motion only in one axis at a time, excluding motion in other axes). Additionally or alternatively, the one or more load alleviation functions may be configured to calculate one or more body rate limits by using one or more current measured rotational rates along one or more axes as maintained when calculating limits about another axis (e.g., assuming one or more current measured rotational rates along one or more axes are maintained when calculating limits about another axis). Additionally or alternatively, the one or more load alleviation functions may be configured to calculate one or more body rate limits to increase (e.g., maximize) maneuver capability along one axis. For example, the one or more load alleviation functions may be configured to calculate one or more body rate limits to dynamically increase (e.g., maximize) maneuver capability along one axis to relieve loads (e.g., increase pitch limits by simultaneously rolling).

At block 1604, the one or more load alleviation functions may select the most restrictive rate limits (e.g., minimum positive roll rate, minimum positive pitch rate, minimum positive yaw rate, maximum negative roll rate, maximum negative pitch rate, maximum negative yaw rate) to send to control law envelope protection block 1606 to be implemented as the aircraft level limits used to determine pilot command limitations, which may be output to limit the ability of pilot commands to control maneuvers of the aircraft.

Figure 17:
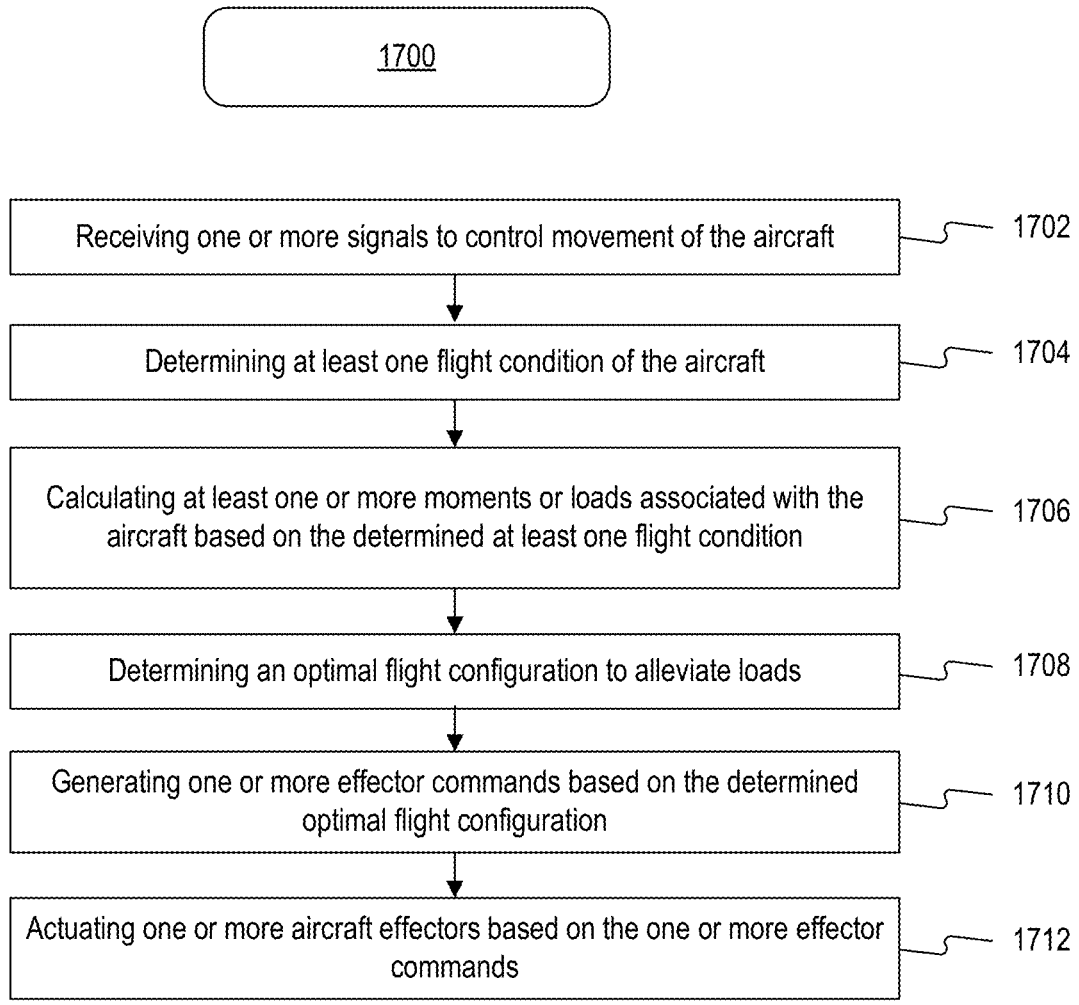
FIG. 17 illustrates an exemplary method for load alleviation, consistent with disclosed embodiments.

FIG. 17 is a flow diagram illustrating an exemplary method 1700 for load alleviation for a particular machine (e.g., an aircraft), according to some embodiments of the present disclosure, thereby improving the technology of aircraft (e.g., aircraft safety, fuel efficiency, payload capacity, structural integrity). The steps of method 1700 may be performable by, for example, system 1000 of FIG. 10 executing on or otherwise using the components of any aircraft of FIGS. 1-8, 9A-9E, 10, 11, 12, 13A-13E, 14A-14B, 15, 16, and/or 18A-18E or any flight control computer (e.g., a computer-implemented method). For example, a flight control computer of the aircraft may be configured to perform one or more steps of method 1700.

The steps of method 1700 may be activated or adjusted as needed based on aircraft flight conditions, maneuvers, or operational requirements. It is appreciated that the illustrated method 1700 can be altered to modify the order of steps and to include additional steps. It is also appreciated that the complexity of method 1700 would be impossible, or at the very least grossly impractical, to effectively implement by a human user, especially when considering that these functionalities are implemented (e.g., in real time) while the aircraft is flying (including taking off or landing), while forces (e.g., loads) experienced by the aircraft are constantly changing. Moreover, alleviating loads (e.g., using method 1700) improves the safety, structural integrity, and longevity of the aircraft, without requiring any direct involvement of a user (e.g., pilot).

In step 1702, system 1000 may receive one or more signals to control movement of the aircraft. For example, the one or more signals may include one or more maneuver inputs from a pilot to control movement of the aircraft. Maneuver inputs may include inputs received from one or more pilot input devices (e.g., right inceptor, left inceptor) or received from an autopilot system, such as discussed above with respect to FIG. 10.

In step 1704, system 1000 may determine at least one flight condition of the aircraft. In some embodiments, system 1000 may be configured to determine at least one flight condition of the aircraft using one or more sensors (e.g., accelerometer, gyroscope, air data sensor, propulsion system sensor, control surface deflection sensor, global positioning system (GPS)).

Optionally, the at least one flight condition may comprise a phase of flight. For example, the phase of flight may comprise hover, cruise, or transition, or any other phase of flight discussed herein. In some embodiments, the at least one flight condition may include one or more of an acceleration, angular rate, airspeed, altitude, angle of attack, bank angle, pitch angle, rotor or propeller RPM, tilt angle (e.g., of one or more propellers), thrust output, a torque of at least one (e.g., each) propulsion unit, power consumption, control surface deflection, aircraft position, aircraft location, velocity, trajectory, or any other state of the aircraft or aircraft component. A flight condition attribute may be determined based on a measurement (e.g., by a sensor) and/or at least one pilot command, consistent with disclosed embodiments.

Optionally, one or more inertial measurement units (IMUs), such as accelerometers or gyroscopes, may be configured to measure accelerations or angular rates long the aircraft's axes of motion (e.g., roll, pitch, yaw). Based on analysis of rate of change in the measured accelerations or angular rates, IMUs may provide system 1000 with information about the aircraft's overall motion and stability. For example, when the IMUs detect minimal changes in acceleration or angular rates, system 1000 may determine that the aircraft is in a hover phase of flight.

Optionally, one or more air data sensors may be configured to measure one or more air data parameters, such as airspeed, altitude, and/or angle of attack. Based on information from air data sensors, system 1000 may determine the phase of flight. For example, based on information from air data sensors remaining relatively constant, system 1000 may determine that the aircraft is in a cruise phase of flight. Additionally or alternatively, system 1000 may determine that the aircraft is in a transition phase of flight (e.g., based on the airspeed increasing).

Optionally, one or more propulsion system sensors may be configured to monitor one or more propeller related parameters, such as rotor or propeller RPM, thrust output, or power consumption, to provide system 1000 with information about a state of each propulsion unit. Based on the one or more propeller related parameters, system 1000 may determine the phase of flight. For example, based on detecting changes in the one or more propeller related parameters, system 1000 may determine that the aircraft is in a transition phase of flight (e.g., propeller RPM increase or thrust vectoring angle change may indicate transition from hover to forward flight).

Optionally, one or more control surface deflection sensors may be configured to monitor a deflection of one or more control surfaces. Based on the one or more control surface deflection sensors, system 1000 may determine the phase of flight. For example, based on changes in control surface deflections, system 1000 may determine that the aircraft is in a transition phase of flight (e.g., adjusting orientation and flight path to transition from vertical to horizontal flight).

Optionally, one or more navigation systems (e.g., GPS) may be configured to provide information about an aircraft's position, velocity, or trajectory. Based on changes in position or velocity over time, system 1000 may determine the phase of flight.

In step 1706, system 1000 may calculate at least one or more moments or loads associated with the aircraft based on the determined at least one flight condition. For example, system 1000 may be configured to calculate at least one or more bending moments, one or more bending loads, and/or one or more torsional loads.

Bending load may refer to an external force or load applied to a structural member. In some embodiments, bending load may be expressed in units of force (e.g., pounds or Newtons) and may represent a magnitude of force applied to a structure.

Bending moment may refer to a measure of internal bending induced within a structural member in response to an applied bending load. In some embodiments, bending moment may be expressed in units of force multiplied by distance (e.g., pound-feet or Newton-meters), and may represent a tendency of a structure to bend or deform under an applied load.

Torsional load may refer to a measure of force causing an object to rotate or twist. For example, torsional loads may be induced by torque generated by one or more propellers, such as during sudden changes in speed or direction. Additionally or alternatively, differences in thrust between rotors (e.g., asymmetric thrust) may cause torsional loads. Additionally or alternatively, uneven aerodynamic forces may cause torsional loads. In some embodiments, torsional load may be expressed in units of torque (e.g., pound-feet or Newton-meters) or an angle of twist (e.g., radians or degrees) to which an object twists under a torsional load.

In some embodiments, calculating at least one or more moments or loads may include analyzing aerodynamic forces or moments (e.g., loads) acting on the aircraft during various flight conditions. In some embodiments, forces may include lift, drag, or side forces. In some embodiments, moments may include pitch, roll, or yaw moments generated by an airflow around the aircraft. In some embodiments, aerodynamic analysis may comprise one or more of computational fluid dynamics (CFD) simulations, wind tunnel testing, or any empirical methods based on at least one of an aircraft geometry or flight parameters.

In some embodiments, calculating at least one or more moments or loads may include predicting loads, such as by using structural modeling. Structural modeling may comprise generating a structural model of the aircraft's components (e.g., wings, fuselage, control surfaces, propulsion units) to represent component behavior under loads (e.g., predicting how different components will respond to aerodynamic loads). In some embodiments, structural modeling may be based on at least one of material properties (e.g., Young's modulus, yield strength) or geometric characteristics (e.g., cross-sectional area, moment of inertia) of each structural element.

In some embodiments, calculating at least one or more moments or loads may include applying the analyzed aerodynamic forces or moments to the structural model. For example, system 1000 may be configured to determine a distribution of loads among the various structural components based on one or more structural component properties such as position, geometry, size, orientation, or stiffness. In some embodiments, system 1000 may be configured to use (e.g., as constraints, as variables, and inputs) factors such as bending (e.g., wing bending, fuselage bending) or torsional effects induced by aerodynamic forces.

In some embodiments, calculating one or more moments or loads may include structural analysis based on a determined load distribution. For example, a combination of applied loads and a structural response of a component may result in bending moment, causing bending or deformation of the component. In some embodiments, moments may be determined using Euler-Bernoulli beam theory. In some embodiments, moments may be determined using finite element analysis (FEA).

In some embodiments, system 1000 may be configured to analyze bending stress induced by calculated bending moments. For example, system 1000 may be configured to calculate bending stresses (e.g., expressed in units of pressure or force per unit area), and may compare the calculated bending stresses to predetermined stress limits. Doing so may ensure a structural integrity or safety of the aircraft under various operating conditions.

In step 1708, system 1000 may determine an optimized flight configuration to alleviate loads (e.g., aerodynamic loads, weight loads, engine loads, structural loads, dynamic loads, etc.) on one or more components of the aircraft based on the received one or more signals and the calculated moments or loads. An optimized flight configuration may include a state (e.g., angle for an actuator, speed of rotation of a propeller, and/or any flight condition) of one or more components on the aircraft, such as one or more of a flaperon, EPU (e.g., tiltable and/or non-tiltable), ruddervator, tail, fuselage, control surface, a non-control surface (e.g., wing), actuator, effector, or any part that can receive and execute commands (e.g., electrical commands). For example, an optimized flight configuration may include an angle for an actuator configured to control a tilt angle of a tiltable EPU. Additionally or alternatively, an optimized flight configuration may include one or more commands configured to achieve a particular state of the aircraft and/or aircraft components.

System 1000 may determine the optimized flight configuration based on (e.g., using) one or more load alleviation functions. A flight configuration may include a specific combination of aircraft settings (e.g., phase of flight), control surface deflections, propulsion system settings, or flight parameters. In some embodiments, determining an optimized flight configuration may include inputting candidate effector commands into a state space model configured to predict one or more output states of the aircraft based on possible commands. For example, the state space model may use information from the plurality of sensors (e.g., feedback sensors) to output at least one predicted state (e.g., optimized configuration) of the aircraft which may be compared to an actual state of the aircraft. Based on the comparison, system 1000 may be configured to generate one or more effector commands to minimize a difference between a predicted state (e.g., optimized configuration) and actual state. In some embodiments, the state space model may be configured to analyze (e.g., for optimality relative to constraints) consider a plurality of candidate configurations before outputting the optimized configuration.

In some embodiments, system 1000 may determine an optimized flight configuration to alleviate loads while not altering a trim state of the aircraft, or while not altering a trim state of the aircraft beyond a predetermined threshold. Additionally or alternatively, system 1000 may determine an optimized flight configuration based on one or more flight conditions, such as a phase of flight, consistent with disclosed embodiments. For example, 1000 may determine one or more priorities to apply to different components based on a phase of flight (e.g., including with use of a state space model), such as by prioritizing reducing a load experienced by one component (e.g., effector, propeller) while tolerating a lower reduction or a higher load for another component (e.g., as discussed below).

In some embodiments, the optimized flight configuration in the hover phase of flight for roll movement may comprise one or more effector commands causing a small amount of thrust outboard (e.g., adjusting thrust generated by outboard propellers to be less than thrust generated by inboard propellers), causing a larger amount of thrust inboard (e.g., adjusting thrust generated by inboard propellers to be greater than thrust generated by outboard propellers), causing flaperon movement, or a combination thereof.

In some embodiments, the optimized flight configuration in the hover phase of flight for yaw movement may comprise one or more effector commands for nacelle tilt, differential torque on propellers (e.g., as discussed above with respect to FIGS. 10, 13D, and 13E), or a combination of both.

In some embodiments, the optimized flight configuration may be determined based on one or more flight conditions of the aircraft, such as at least a speed, bank angle, or angle of attach of the aircraft. In some embodiments, system 1000 may determine the optimized flight configuration that decreases a load on at least one part of the aircraft, but may also increase a load on at least one other part of the aircraft. For example, when the speed of the aircraft is within a first range (e.g., under a predetermined threshold, which may be associated with a hover range), the optimized flight configuration may comprise one or more effector commands to increase one or more tail loads, decrease one or more boom loads, or a combination of both. In some embodiments, when the speed of the aircraft is within a second range (e.g., above the predetermined threshold, which may be associated with a cruise range), the optimized flight configuration may comprise one or more effector commands to decrease one or more tail loads, increase one or more boom loads, or a combination of both.

In some embodiments, the optimized flight configuration may be further determined based on one or more tail load limits or boom load limits. In some embodiments, system 1000 determine an optimized flight configuration by prioritizing decreasing loads experienced by propellers at speeds below a threshold (e.g., low speeds that may be associated with a hover phase of flight), which may cause at least one other component to experience a load beyond its possible minimum for the phase of flight.

In some embodiments, determining the optimized flight configuration may comprise determining an optimized combination of effector states based on a criticality of one or more components (e.g., critical structures), such as boom structure, wing structure, wing root bending, wing tip bending, rotor/propeller system, batteries, control surfaces, motors, tail, fuselage, actuators, effectors, or any other component of the aircraft. For example, the criticality (e.g., structural criticality for maintaining structural integrity, system criticality wherein failure could result in inability to complete a flight or loss of control, performance criticality for efficient operation, or mission criticality for specific missions) of each component may increase or decrease based on the at least one flight condition, which may be used to determine the optimized flight configuration. In some embodiments, a criticality of one or more components may be determined based on the determined flight condition of the aircraft. For example, a criticality of one or more components may be determined based on a phase of flight (e.g., takeoff, hover, transition to or from forward flight, cruise, landing) of the aircraft, wherein one or more first components of the aircraft may be determined to be more critical for maintaining structural integrity and performance in certain phases of flight than one or more second components. Additionally or alternatively, a criticality of one or more components may be based on a commanded maneuver (e.g., roll, pitch, yaw), wherein, based on the commanded maneuver, system 1000 may determine that one or more first components are more critical than one or more second components. In response to determining that one or more first components are more critical than one or more second components, system 1000 may determine the optimized flight configuration to alleviate loads on the one or more first components (e.g., by redistributing loads to the one or more second components).

In step 1710, system 1000 may generate one or more effector commands based on the determined optimized flight configuration, and, in step 1712, system 1000 may actuate one or more aircraft effectors based on the one or more effector commands (which may include transmitting the one or more effector commands to respective effectors). For example, effector commands may cause adjustment of one or more effectors (e.g., to achieve the optimized flight configuration), such as by changing control surface deflection, varying engine thrust levels, adjusting rotor or propeller speeds, or a combination thereof. In some embodiments, actuating one or more aircraft effectors may comprise modifying an RPM of one or more propellers. For example, modifying an RPM of one or more propellers may tailor (e.g., modify, configure, adjust, distribute, smooth) wing distribution lift. Effector commands may comprise commands to one or more flight elements (e.g., actuator commands or commands to effectors, such as control surfaces, such as elevators, ailerons, rudder, ruddervators, spoiler, engines, flaperons, tail, rotors, propulsion units, propellers, etc.), such as discussed above with respect to FIG. 10.

In some embodiments, system 1000 may be configured to define absolute and non-absolute load limits (e.g., specify in memory). Absolute load limits may represent maximum loads that a structure can endure without experiencing failure or permanent damage. In some embodiments, absolute load limits may be based on material properties, geometry, and/or a design configuration (e.g., architecture) of the aircraft. Additionally or alternatively, absolute load limits may consider safety factors.

Non-absolute load limits may represent load limits that depend on operational scenarios (e.g., environmental factors, operational restrictions, temporary load allowances, etc.). For example, non-absolute load limits may provide flexibility to accommodate temporary deviations from standard operation conditions.

Absolute and non-absolute load limits may be utilized at any point in a load alleviation process (e.g., method 1700). For example, system 1000 may be configured to determine the optimized flight configuration based on the defined absolute and non-absolute load limits. Additionally or alternatively, system 1000 may be configured to generate one or more effector commands based on the defined absolute and non-absolute load limits. In some embodiments, system 1000 may prioritize absolute limits over non-absolute load limits. For example, in a situation where both absolute limits and non-absolute limits cannot be respected (e.g., cannot perform commands such that aircraft stays under limits), system 1000 may prioritize respecting absolute limits over respecting non-absolute limits.

In some embodiments, system 1000 may be configured to perform any load alleviation steps (e.g., of method 1700) as part of a flight control optimization problem. The flight control optimization problem may comprise a mathematical expression used to quantify a performance (e.g., efficiency) of a control strategy for operational objectives (e.g., load alleviation, energy efficiency, aircraft stability, thermal balancing, vibration attenuation, etc.). In some embodiments, load alleviation may be a factor (e.g., cost) in a cost function of the flight control optimization problem (e.g., solved by control allocation 1029 of FIG. 10). For example, step 1708 may include determining a cost associated with each candidate configuration and selecting a candidate configuration with the lowest cost as the optimized configuration for load alleviation. Additionally or alternatively, step 1710 may include generating the one or more effector commands such that the overall cost function is minimized. For example, system 1000 may perform step 1710 by iteratively adjusting one or more weighting factors or control parameters associated with each operational objective to output a combination of effector commands that achieves an optimal balance between the operational objectives (e.g., indicated by overall value of the cost function, where a lower value indicates better performance according to the defined objectives). In some embodiments, system 1000 may generate the one or more effector commands further based on the adjusted weighting factors or control parameters.

Figure 18A:
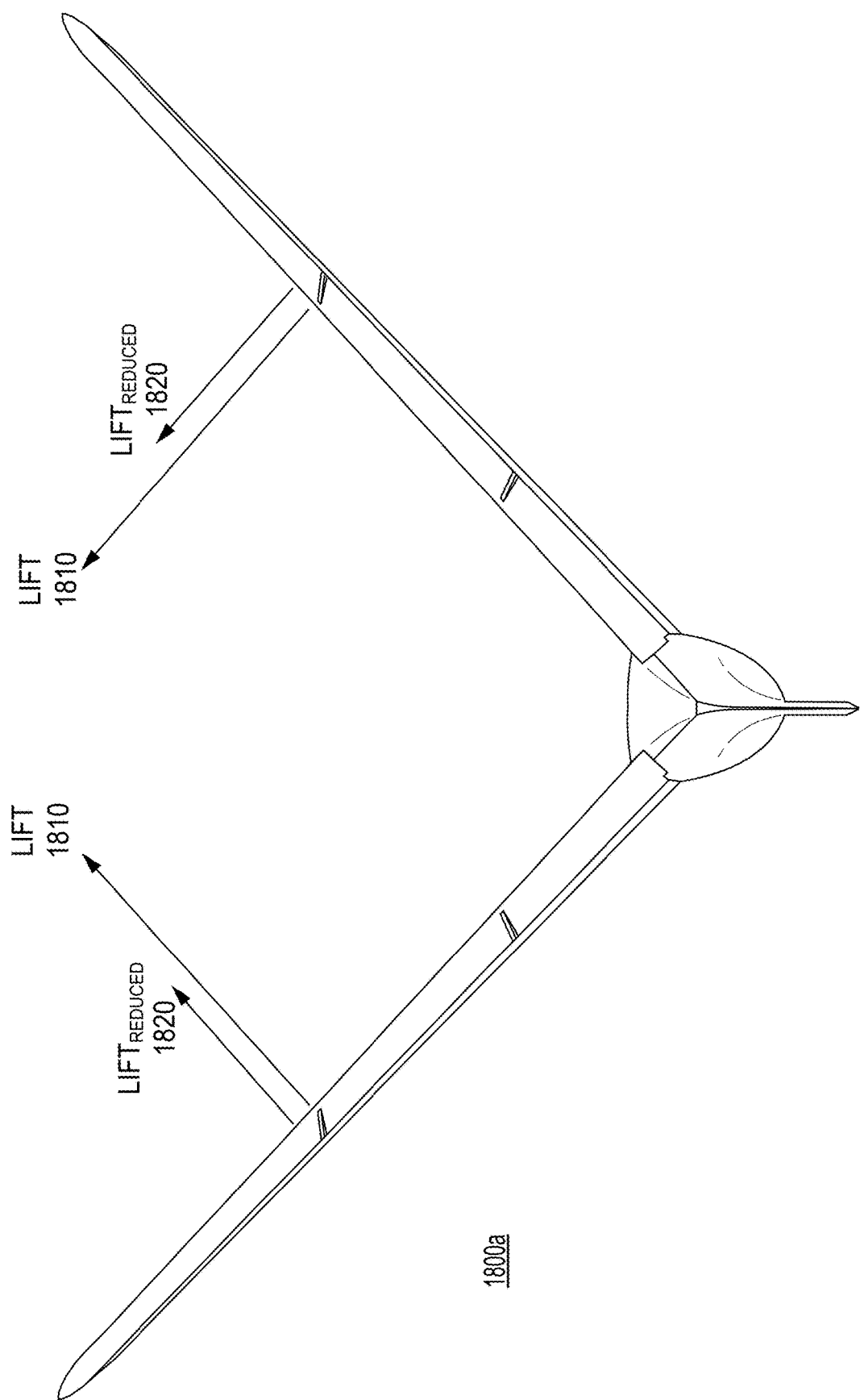
FIGS. 18A-18B illustrate exemplary approaches for load alleviation, according to various disclosed embodiments.
Figure 18B:
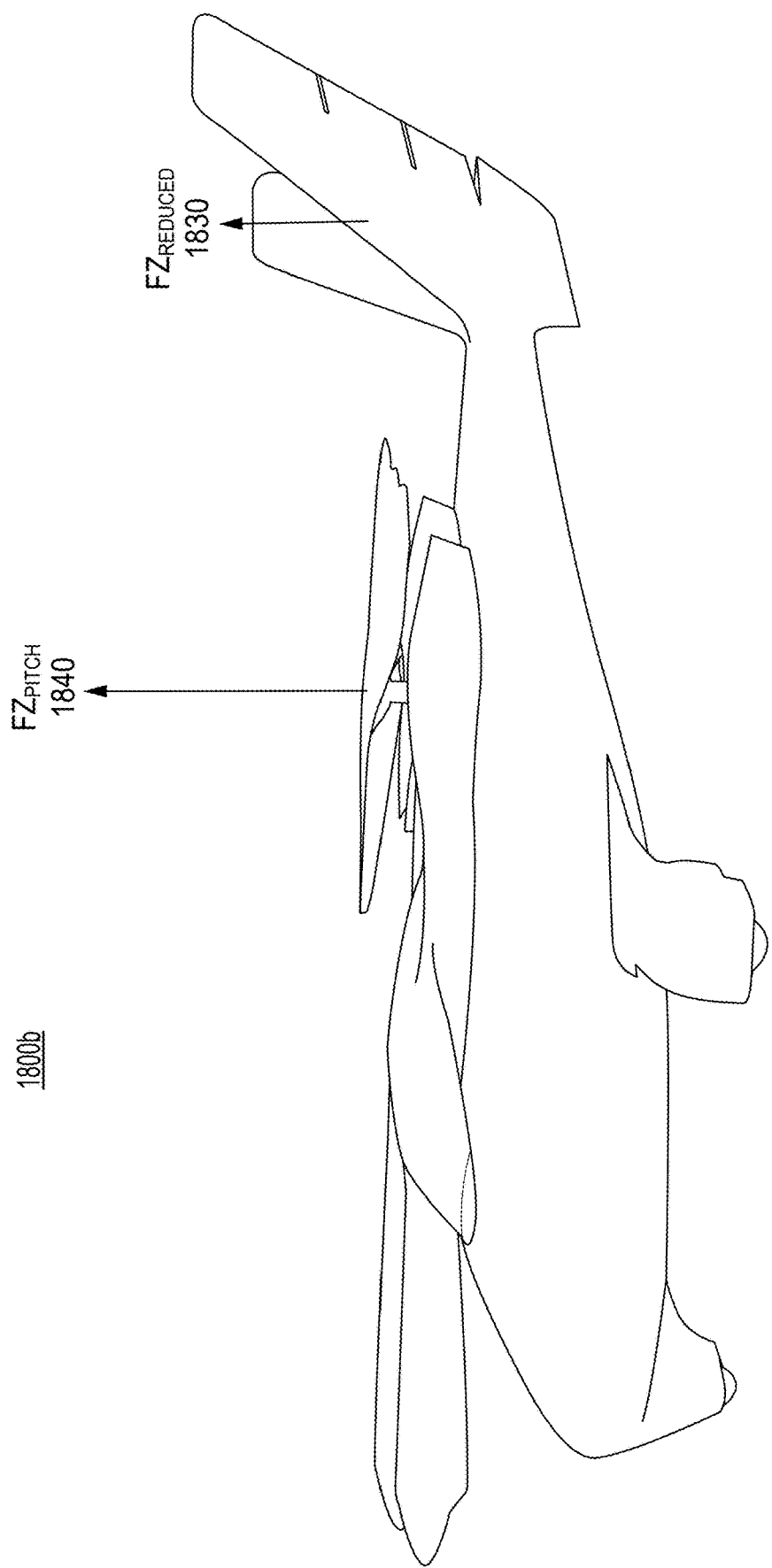
Figure 18C:
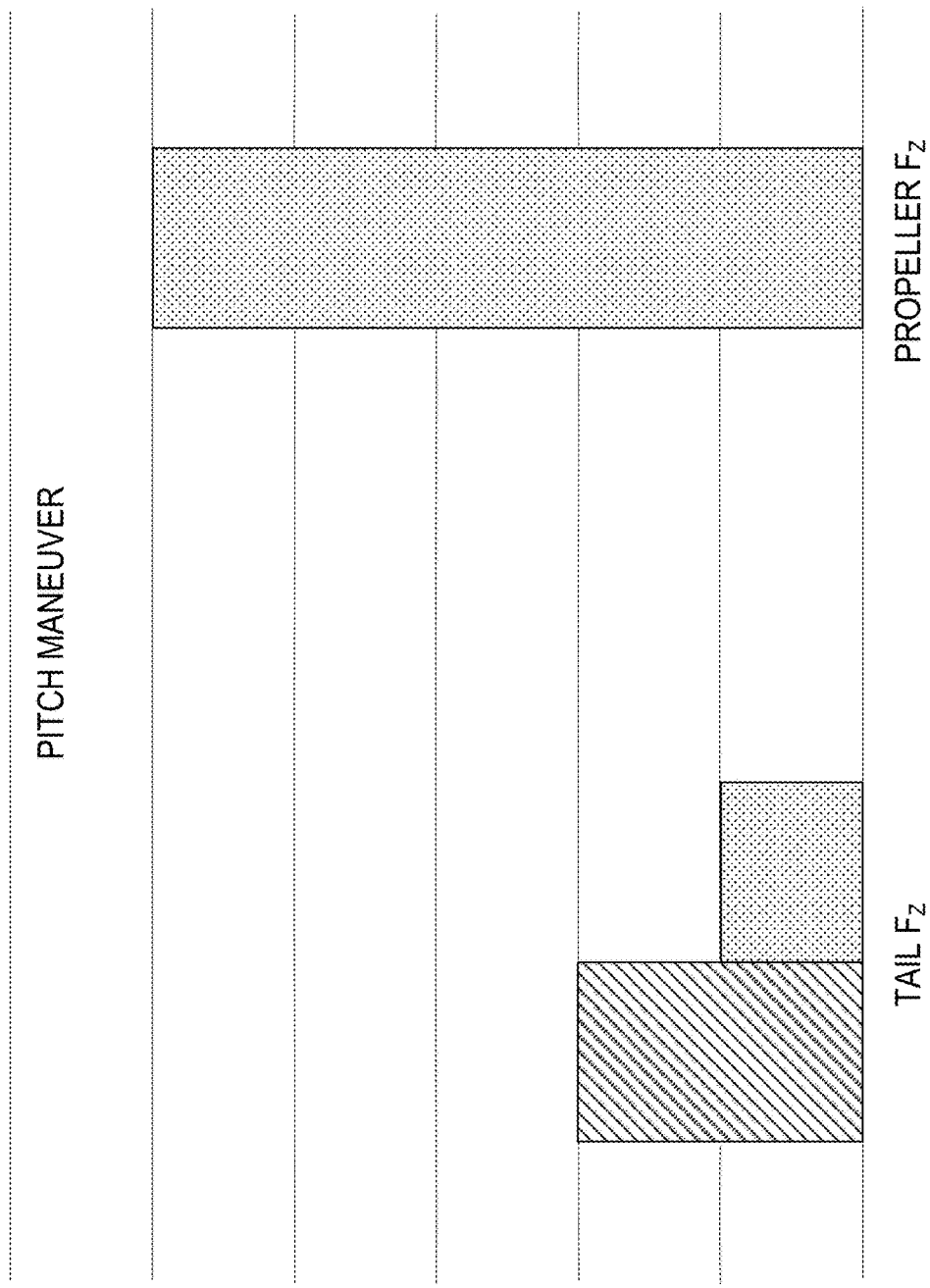
FIGS. 18C-18E illustrate charts of exemplary comparisons between standard and modified maneuvers for load alleviation, according to various disclosed embodiments.

FIG. 18A is a diagram illustrating an exemplary approach 1800a, according to some disclosed embodiments. As shown in 1800a, in order to perform a certain maneuver, such as a pitch maneuver, a certain amount of lift force 1810 may be generated by the tail. However, in some scenarios, such as when a structural criticality of the tail is high (e.g., the tail may bear significant loads when a speed of the aircraft is high), system 1000 may reduce an amount of lift force generated by the tail, such that a reduced lift force 1820 is generated by the tail. In order to supplement a reduced lift force generated by the tail, it may be useful to generate a force elsewhere on the aircraft, as shown in FIG. 18B, which illustrates an exemplary approach 1800b, according to some disclosed embodiments. As shown in 1800b, in order to make up for the reduced force 1830 generated by the tail, load alleviation functions may be configured to command one or more lifter propellers to generate one or more forces 1840. FIG. 18C is a chart illustrating an exemplary comparison of forces for different maneuvers, such as those described with respect to FIGS. 18A and 18B. For example, while standard maneuver 1850 may comprise only a tail force, modified maneuver 1860 may comprise both a tail force and a propeller force.

Figure 18D:
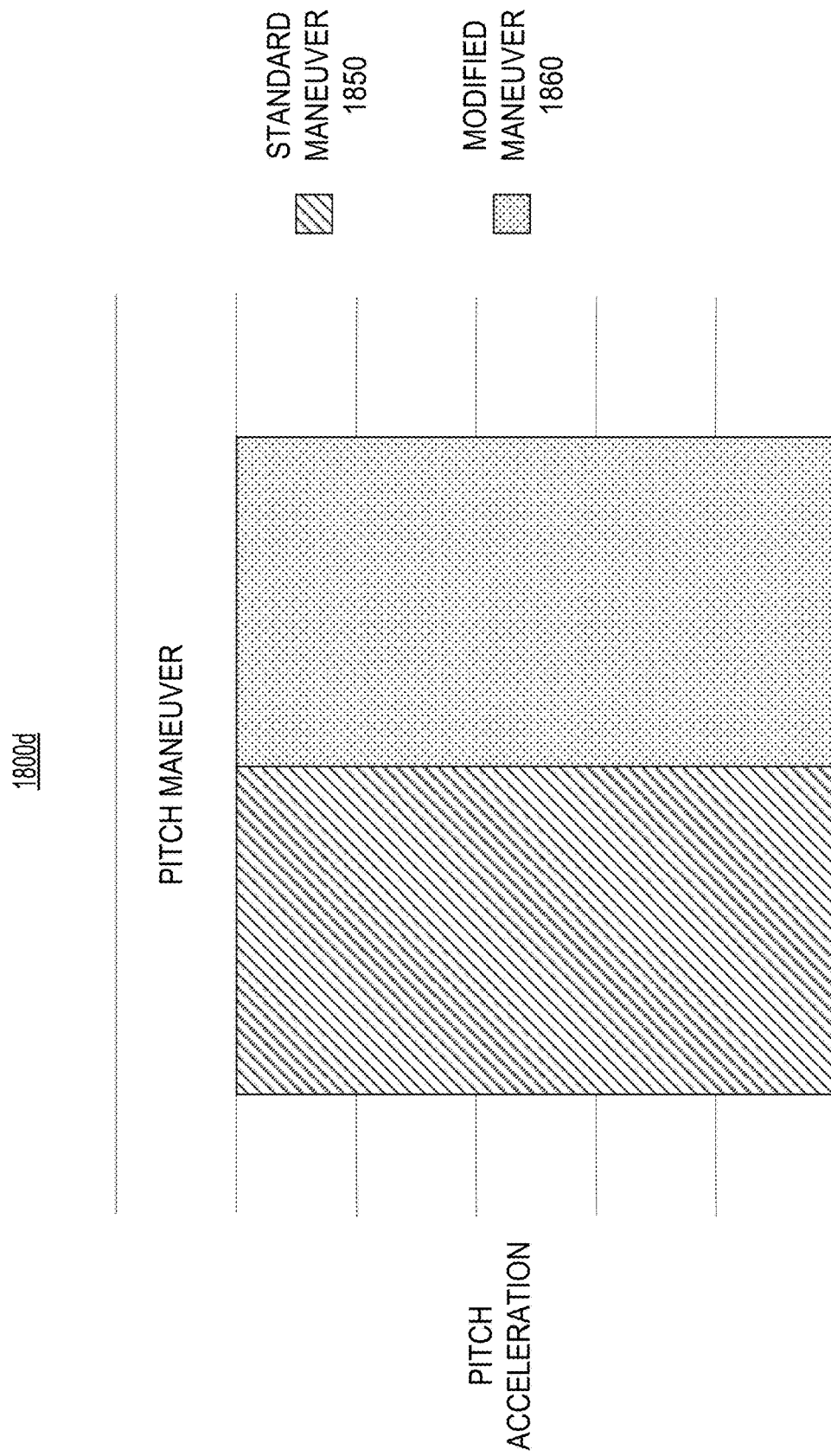

FIG. 18D is a chart illustrating an exemplary comparison of pitch acceleration for different maneuvers, according to some disclosed embodiments. As shown in the comparison of standard maneuver 1850 and modified maneuver 1860 in 1800d, even with different maneuvers and different forces as described with respect to FIGS. 18A to 18C, the same pitch acceleration can be achieved.

Figure 18E:
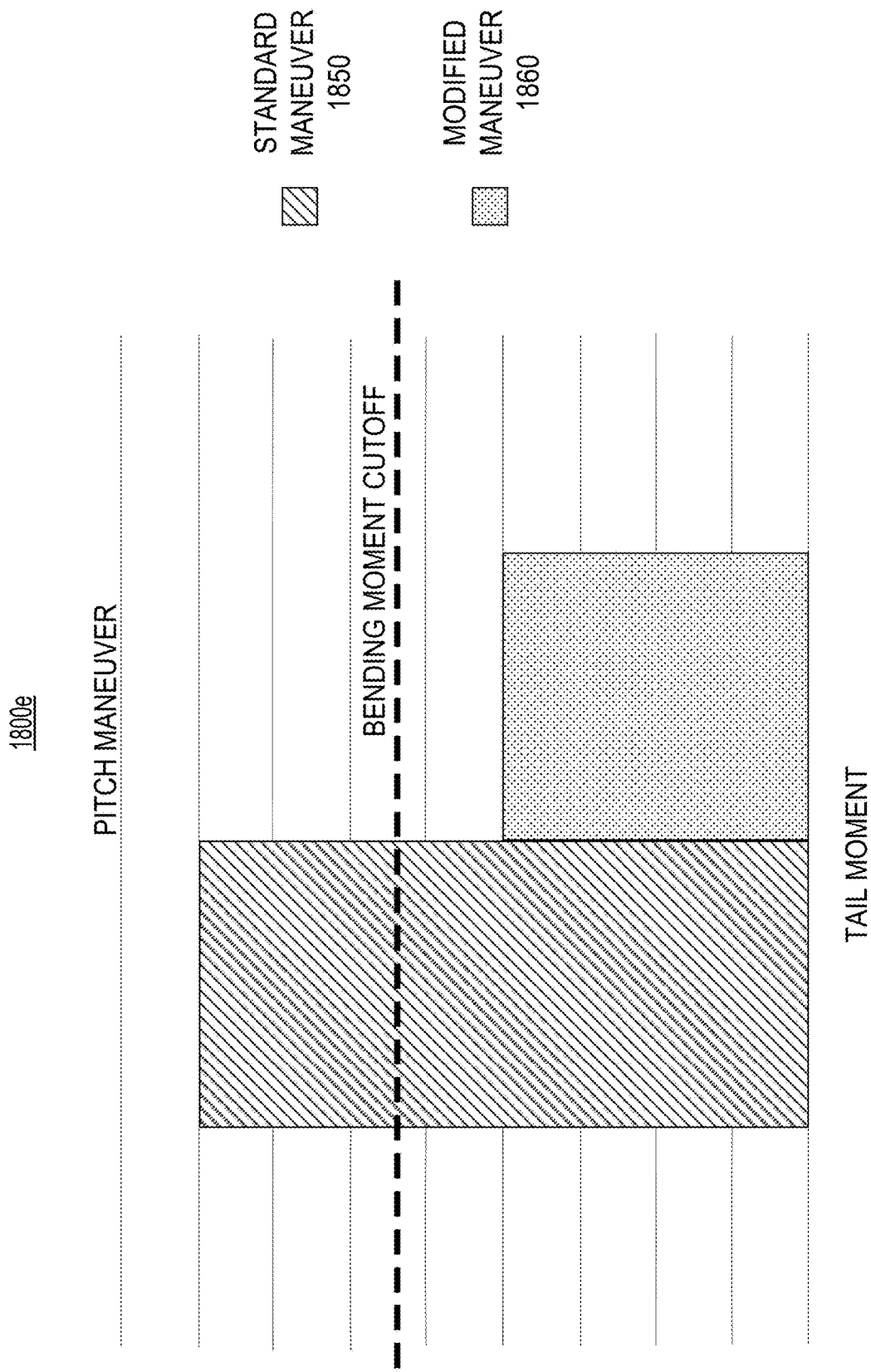

FIG. 18E is a chart illustrating an exemplary comparison of moments for different maneuvers, according to some disclosed embodiments. As shown in the comparison of standard maneuver 1850 and modified maneuver 1860 in 1800e, different maneuvers may result in different moments, such as bending moments. For example, load alleviation functions may be configured to account for one or more moment cutoffs (e.g., limit that is predetermined, desired, ideal) by generating maneuvers that tailor (e.g., modify) forces generated by aircraft effectors. As such, while standard maneuvers, such as standard maneuver 1850 may not result in tail moments below a bending moment cutoff, modified maneuvers, such as modified maneuver 1860 which reduces forces generated by the tail, may result in a tail moment below the bending moment cutoff.

Additional aspects of the present disclosure may be further described via the following clauses:

1. A computer-implemented method comprising:
   receiving one or more signals to control movement of an aircraft;
   determining using a plurality of sensors included in the aircraft, at least one flight condition of the aircraft, wherein the at least one flight condition includes at least a phase of flight;
   calculating at least one or more loads associated with the aircraft based on the determined at least one flight condition;
   determining an optimized flight configuration to alleviate loads on one or more components of the aircraft based on the received one or more signals and the calculated loads;
   generating one or more effector commands based on the determined optimized flight configuration; and
   actuating one or more aircraft effectors based on the one or more effector commands.
2. The computer-implemented method of clause 1, wherein the one or more signals to control movement of the aircraft are received from one or more pilot inceptors.
3. The computer-implemented method of clause 1 or 2, wherein calculating the one or more loads comprises calculating one or more bending moments, bending loads, or torsional loads, based on a force of at least a first propeller and a distance of at least the first propeller from a midline of the aircraft.
4. The computer-implemented method of any of clauses 1-3, wherein the at least one flight condition includes a torque of each propulsion unit of a plurality of propulsion units.
5. The computer-implemented method of any of clauses 1-4, wherein the phase of flight is hover, cruise, or transition.
6. The computer-implemented method of any of clauses 1-5, wherein, when the aircraft is in a hover phase of flight, the method comprises causing the aircraft to perform a roll movement based on at least one of the one or more effector commands configured to cause one or more inboard propellers to generate more thrust than one or more outboard propellers, or perform a flaperon movement.
7. The computer-implemented method of any of clauses 1-6, wherein, when the aircraft is in a hover phase of flight, the method comprises causing the aircraft to perform a yaw movement using at least one of:
   one or more effector commands for nacelle tilt; or
   differential torque on propellers.
8. The computer-implemented method of any of clauses 1-7, wherein determining the optimized flight configuration comprises inputting candidate effector commands into a state space model configured to output the optimized flight configuration of the aircraft based on the candidate effector commands.
9. The computer-implemented method of clause 8, wherein the state space model utilizes information from the plurality of sensors to output the optimized flight configuration of the aircraft.
10. The computer-implemented method of any of clauses 1-9, wherein the method further comprises comparing the optimized flight configuration to an actual state of the aircraft, and wherein generating one or more effector commands includes minimizing a difference between the optimized flight configuration and the actual state.
11. The computer-implemented method of any of clauses 1-10, wherein actuating one or more aircraft effectors based on the one or more effector commands includes modifying a revolutions-per-minute (RPM) of each propeller of the aircraft.
12. The computer-implemented method of any of clauses 1-11, further comprising defining absolute and non-absolute load limits, wherein determining the optimized flight configuration is based on the defined absolute and non-absolute load limits.
13. The computer-implemented method of any of clauses 1-12, wherein the one or more aircraft effectors comprise one or more of propellers, engines, flaperons or a tail.
14. The computer-implemented method of any of clauses 1-13, further comprising detecting, using at least one sensor of the plurality of sensors, dynamic gusts acting on the aircraft, wherein actuating one or more aircraft effectors includes automatically adjusting one or more control surfaces of the aircraft to redistribute one or more loads to minimize an impact of the dynamic gusts.
15. The computer-implemented method of any of clauses 1-14, wherein the method is performed by a flight control system of the aircraft, and wherein the flight control system of is communicatively coupled to at least one high voltage electrical power source of the aircraft.
16. The computer-implemented method of any of clauses 1-15, wherein actuating one or more aircraft effectors based on the one or more effector commands causes reduced power draw from at least one high voltage electrical power source.
17. The computer-implemented method of any of clauses 1-16, wherein the method is performed by a flight control system of the aircraft.
18. A flight control computer comprising:
   one or more memory devices storing processor-executable instructions; and
   one or more processors configured to execute the instructions to cause the flight control computer to perform the computer-implemented method of any of clauses 1-17.
19. A non-transitory computer-readable medium having stored thereon computer-readable instructions that, when executed by at least one processor, cause the at least one processor to execute the computer-implemented method of any of clauses 1-17.
20. An aircraft comprising at least one flight control computer configured to perform the computer-implemented method of any of clauses 1-17.
21. A flight control system comprising:
   at least one memory storing instructions; and
   at least one processor configured to execute the instructions to perform the computer-implemented method of any of clauses 1-17.
22. A flight control system of an aircraft comprising:
   at least one memory storing instructions; and at least one processor configured to execute the instructions to perform one or more operations, the operations comprising:
  receiving one or more signals to control movement of the aircraft;
  determining, using a plurality of sensors included in the aircraft, at least one flight condition of the aircraft, wherein the at least one flight condition includes at least a phase of flight;
  calculating at least one or more loads associated with the aircraft based on the determined at least one flight condition;
  determining an optimized flight configuration to alleviate loads on one or more components of the aircraft based on the received one or more signals and the calculated loads;
  generating one or more effector commands based on the determined optimized flight configuration; and
  actuating one or more aircraft effectors based on the one or more effector commands.

23. The flight control system of clause 22, wherein the one or more signals to control movement of the aircraft are received from one or more pilot inceptors.

24. The flight control system of clause 22 or 23, wherein calculating the one or more loads comprises calculating one or more bending moments, bending loads, or torsional loads, based on a force of at least a first propeller and a distance of at least the first propeller from a midline of the aircraft.

25. The flight control system of any of clauses 22-24, wherein the at least one flight condition includes a torque of each propulsion unit of a plurality of propulsion units.

26. The flight control system of any of clauses 22-25, wherein the phase of flight is hover, cruise, or transition.

27. The flight control system of any of clauses 22-26, wherein, when the aircraft is in a hover phase of flight, the flight control system is configured to cause the aircraft to perform a roll movement based on at least one of the one or more effector commands configured to cause one or more inboard propellers to generate more thrust than one or more outboard propellers, or perform a flaperon movement.

28. The flight control system of any of clauses 22-27, wherein, when the aircraft is in a hover phase of flight, the flight control system is configured to cause the aircraft to perform a yaw movement using at least one of:
  one or more effector commands for nacelle tilt; or
  differential torque on propellers.

29. The flight control system of any of clauses 22-28, wherein determining the optimized flight configuration comprises inputting candidate effector commands into a state space model configured to output the optimized flight configuration of the aircraft based on the candidate effector commands.

30. The flight control system of clause 29, wherein the state space model utilizes information from the plurality of sensors to output the optimized flight configuration of the aircraft.

31. The flight control system of any of clauses 22-30, wherein the operations further comprise comparing the optimized flight configuration to an actual state of the aircraft, and wherein generating one or more effector commands includes minimizing a difference between the optimized flight configuration and the actual state.

32. The flight control system of any of clauses 22-31, wherein actuating one or more aircraft effectors based on the one or more effector commands includes modifying a revolutions-per-minute (RPM) of each propeller of the aircraft.

33. The flight control system of any of clauses 22-32, wherein the operations further comprise defining absolute and non-absolute load limits, and wherein generating the one or more effector commands is further based on the defined absolute and non-absolute load limits.

34. The flight control system of any of clauses 22-33, wherein the one or more aircraft effectors comprise one or more of propellers, engines, flaperons or a tail.

35. The flight control system of any of clauses 22-34, wherein the operations further comprise detecting, using at least one sensor of the plurality of sensors, dynamic gusts acting on the aircraft, and wherein actuating one or more aircraft effectors includes automatically adjusting one or more control surfaces of the aircraft to redistribute one or more loads to minimize an impact of the dynamic gusts.

36. The flight control system of any of clauses 22-35, wherein the flight control system is communicatively coupled to at least one high voltage electrical power source of the aircraft.

37. The flight control system of clause 36, wherein actuating one or more aircraft effectors based on the one or more effector commands causes reduced power draw from the at least one high voltage electrical power source.

38. A non-transitory computer-readable medium storing one or more instructions that, when executed by at least one processor, cause the at least one processor to perform operations comprising:
  receiving one or more signals to control movement of an aircraft;
  determining, using a plurality of sensors included in the aircraft, at least one flight condition of the aircraft, wherein the at least one flight condition includes at least a phase of flight;
  calculating at least one or more loads associated with the aircraft based on the determined at least one flight condition;
  determining an optimized flight configuration to alleviate loads on one or more components of the aircraft based on the received one or more signals and the calculated loads;
  generating one or more effector commands based on the determined optimized flight configuration; and
  actuating one or more aircraft effectors based on the one or more effector commands.

39. A computer-readable medium having stored thereon computer-readable instructions that, when executed by at least one processor, cause the at least one processor to execute the method of any of clauses 1-17.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being influenced by, or being responsive to. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:

1. A flight control system of an aircraft comprising:
   at least one memory storing instructions; and
   at least one processor configured to execute the instructions to perform one or more operations, the operations comprising:
   receiving one or more signals to control movement of the aircraft;
   determining, using a plurality of sensors included in the aircraft, at least one flight condition of the aircraft, wherein the at least one flight condition includes at least a phase of flight;
   calculating one or more loads associated with the aircraft based on the determined at least one flight condition;
   determining an optimized flight configuration to alleviate loads on one or more components of the aircraft based on the received one or more signals and the calculated one or more loads, wherein determining the optimized flight configuration comprises inputting candidate effector commands into a mathematical model and predicting a distribution of loads associated with the aircraft;
   generating one or more effector commands based on the determined optimized flight configuration; and
   actuating one or more aircraft effectors based on the one or more effector commands.

2. The flight control system of claim 1, wherein the one or more signals to control movement of the aircraft are received from one or more pilot inceptors.

3. The flight control system of claim 1, wherein calculating the one or more loads comprises calculating one or more bending moments, bending loads, or torsional loads, based on a force of at least a first propeller and a distance of at least the first propeller from a midline of the aircraft.

4. The flight control system of claim 1, wherein the at least one flight condition includes a torque of each propulsion unit of a plurality of propulsion units.

5. The flight control system of claim 1, wherein the phase of flight is hover, cruise, or transition.

6. The flight control system of claim 5, wherein, when the aircraft is in a hover phase of flight, the flight control system is configured to cause the aircraft to perform a roll movement based on at least one of the one or more effector commands configured to cause one or more inboard propellers to generate more thrust than one or more outboard propellers.

7. The flight control system of claim 5, wherein, when the aircraft is in a hover phase of flight, the flight control system is configured to cause the aircraft to perform a yaw movement using at least one of:
   one or more effector commands for nacelle tilt; or
   differential torque on propellers.

8. The flight control system of claim 5, wherein, when the aircraft is in a hover phase of flight, the flight control system is configured to cause the aircraft to perform a roll movement based on at least one of the one or more effector commands configured to cause flaperon movement.

9. The flight control system of claim 1, wherein the mathematical model comprises a state space model.

10. The flight control system of claim 9, wherein the state space model utilizes information from the plurality of sensors to output the predicted distribution of loads associated with the aircraft.

11. The flight control system of claim 1, wherein the operations further comprise comparing the optimized flight configuration to an actual state of the aircraft, and wherein generating one or more effector commands includes minimizing a difference between the optimized flight configuration and the actual state.

12. The flight control system of claim 1, wherein actuating one or more aircraft effectors based on the one or more effector commands includes modifying a revolutions-per-minute (RPM) of each propeller of the aircraft.

13. The flight control system of claim 1, wherein the operations further comprise defining absolute and non-absolute load limits, and wherein generating the one or more effector commands is further based on the defined absolute and non-absolute load limits.

14. The flight control system of claim 1, wherein the one or more aircraft effectors comprise one or more of propellers, engines, flaperons or a tail.

15. The flight control system of claim 1, wherein the operations further comprise detecting, using at least one sensor of the plurality of sensors, dynamic gusts acting on the aircraft, and wherein actuating one or more aircraft effectors includes automatically adjusting one or more control surfaces of the aircraft to redistribute one or more loads to minimize an impact of the dynamic gusts.

16. The flight control system of claim 1, wherein the flight control system is communicatively coupled to at least one high voltage electrical power source of the aircraft.

17. The flight control system of claim 16, wherein actuating one or more aircraft effectors based on the one or more effector commands causes reduced power draw from the at least one high voltage electrical power source.

18. A computer-implemented method for flight control of an aircraft, the method comprising:
   receiving one or more signals to control movement of the aircraft;

determining, using a plurality of sensors included in the aircraft, at least one flight condition of the aircraft, wherein the at least one flight condition includes at least a phase of flight;

calculating one or more loads associated with the aircraft based on the determined at least one flight condition;

determining an optimized flight configuration to alleviate loads on one or more components of the aircraft based on the received one or more signals and the calculated one or more loads, wherein determining the optimized flight configuration comprises inputting candidate effector commands into a mathematical model and predicting a distribution of loads associated with the aircraft;

generating one or more effector commands based on the determined optimized flight configuration; and actuating one or more aircraft effectors based on the one or more effector commands.

19. The computer-implemented method of claim 18, wherein the at least one flight condition includes a torque of each propulsion unit of a plurality of propulsion units.

20. The computer-implemented method of claim 18, wherein the phase of flight is hover, cruise, or transition.

21. A non-transitory computer-readable medium storing one or more instructions that, when executed by at least one processor, cause the at least one processor to perform operations comprising:

receiving one or more signals to control movement of an aircraft;

determining, using a plurality of sensors included in the aircraft, at least one flight condition of the aircraft, wherein the at least one flight condition includes at least a phase of flight;

calculating one or more loads associated with the aircraft based on the determined at least one flight condition;

determining an optimized flight configuration to alleviate loads on one or more components of the aircraft based on the received one or more signals and the calculated one or more loads, wherein determining the optimized flight configuration comprises inputting candidate effector commands into a mathematical model and predicting a distribution of loads associated with the aircraft;

generating one or more effector commands based on the determined optimized flight configuration; and actuating one or more aircraft effectors based on the one or more effector commands.

\* \* \* \* \*